US008464211B2

(12) United States Patent  
Neagu et al.

(10) Patent No.: US 8,464,211 B2  
(45) Date of Patent: Jun. 11, 2013

(54) FORMS CONVERSION AND DEPLOYMENT SYSTEM FOR MOBILE DEVICES

(75) Inventors: Adriana Neagu, Mercer Island, WA (US); Lale Divringi, Bellevue, WA (US); Bogdan V. Dinu, Ploiesti (RO); Dafina-Maria Jeaca, Constanta (RO); Adrian Matei, Bucharest (RO)

(73) Assignee: Formotus, Inc., Bellevue, WA (US)

( * ) Notice: Subject to any disclaimer, the term of this patent is extended or adjusted under 35 U.S.C. 154(b) by 1341 days.

(21) Appl. No.: 12/040,505

(22) Filed: Feb. 29, 2008

(65) Prior Publication Data

US 2008/0244560 A1 Oct. 2, 2008

Related U.S. Application Data

(60) Provisional application No. 60/892,493, filed on Mar. 1, 2007.

(51) Int. Cl.
*G06F 9/445* (2006.01)

(52) U.S. Cl.
USPC .......................................... 717/106; 717/174

(58) Field of Classification Search
USPC .................. 717/106–109, 136–145
See application file for complete search history.

(56) References Cited

U.S. PATENT DOCUMENTS

| 2002/0035579 | A1* | 3/2002 | Wang et al. ................. 707/513 |
| 2003/0093473 | A1* | 5/2003 | Hara ............................ 709/203 |
| 2004/0268229 | A1* | 12/2004 | Paoli et al. .................. 715/508 |
| 2005/0004885 | A1* | 1/2005 | Pandian et al. .................. 707/1 |
| 2006/0161646 | A1 | 7/2006 | Chene et al. |
| 2006/0288046 | A1* | 12/2006 | Gupta et al. ................. 707/200 |
| 2006/0288406 | A1 | 12/2006 | Kuhn et al. |

OTHER PUBLICATIONS

Marcel Muller et al,"The clinical Document Architecture(CDA) Enables Electronic Medical Records to Wireless Mobile computing",2004,IMIA,5 pages.*
International Search Report and Written Opinion for International Patent Application No. PCT/US08/55496, Applicant: Formulations, Inc., mailed Aug. 1, 2008, 9 pages.

* cited by examiner

*Primary Examiner* — Anna Deng  
*Assistant Examiner* — Brahim Bourzik  
(74) *Attorney, Agent, or Firm* — Perkins Coie LLP

(57) ABSTRACT

A method and system for automatically converting forms generated using a desktop forms development tool to be compatible with mobile devices, for deploying the converted forms to the mobile devices, and for running converted forms on the mobile devices is provided. A forms system provides a conversion component, a deployment component, and a device component. A forms file is generated to be processed by a forms display program on a variety of devices. The forms system transforms the forms file to a target form file designed for execution by a target forms display program on a device of the target device type.

19 Claims, 27 Drawing Sheets

| Company | | | | | Support | Sign Out |
|---|---|---|---|---|---|---|

15010

Manage FormoPublish Applications

Home
Solution Manager
  Applications
  Mobile Users
  Mobile Devices
Report Generator
  Applications
  Mobile User
  Account Information
  Profile
  Subscription Find [____] in [FormoPublish application Author ▾]

[ Add ]  [ Show ]

15011

| FormoPublish Application ▲ | Author | Version (W) | Version (P) | Deployments | Usage | |
|---|---|---|---|---|---|---|
| ☐ Day Off | Company | 3.0 | 3.0 | 1 | 0 | ✎✗ |
| ☐ Expense Report | Company | 3.0 | 3.0 | 1 | 1 | ✎✗ |
| ☐ Health Officer Checklist | Company | 2.0 | 2.0 | 0 | 0 | ✎✗ |
| ☐ Select All | | | | | | |

15012

Show [100 ▾] records per page

[ Deploy ▾ ] [ Do Action ]

*FIG. 15-1*

| Company | Support \| Sign Out |
|---|---|

15030

Edit FormoPublish Application

Step 1: Upload FormoPublish Application

FormoPublish Application: Day Off

Author: Company

Source XSN: Day Off.xsn(C:\FormoPublish\FormTemplates\DemoForms\Day Off.xsn)

| CAB: | CAB Name | Size(bytes) | Platform | Operating System |
|---|---|---|---|---|
| | Day OffPPCWM5.CAB | 101759 | Pocket PC | Windows Mobile 5.0 |
| | Day OffSPWM4.CAB | 101463 | Smart Phone | Windows Mobile 5.0 |

Version: 1.1

Last Modified: 11/29/2007 01:56:00 AM GMT

Description: Sample form ⟵ 15032

15031

[Re-Upload]

Step 2: Preview

This preview is an approximation of the FormoPublish™ application that will be deployed to the mobile device.

[Preview]

Step 3: Publish

[Publish] ⟵ 15033

Sidebar:
- Home
- Solution Manager
  - Applications
  - Mobile Users
  - Mobile Devices
  - Report Generator
  - Applications
  - Mobile User
- Account Information
  - Profile
  - Subscription

Company  Support | Sign Out

15050

Home
Solution Manager
  Applications
  Mobile Users
  Mobile Devices
Report Generator
  Applications
  Mobile User
Account Information
  Profile
  Subscription

Manage Mobile Users
Device Quota: 5   Device Used: 1

Find [____] in [Organization / Mobile User ▼]   ☐ Include disabled   [Show]   [Show All] — 15051

| Organization | Mobile User | Registered On ▼ | Device Id | Device Name | Operating System | Device Platform |
|---|---|---|---|---|---|---|
| ☐ Company | First Mobile User | 11/29/2007 01:08:00 AM GMT | c0775b22ef29d8a33f691 84321bbdcce8b428815 | WM_company | Windows Mobile 5.0 | Pocket PC |

☐ Select All

15052

Show [10 ▾] records per page

[Enable ▾]  [Do Action]

*FIG. 15-5*

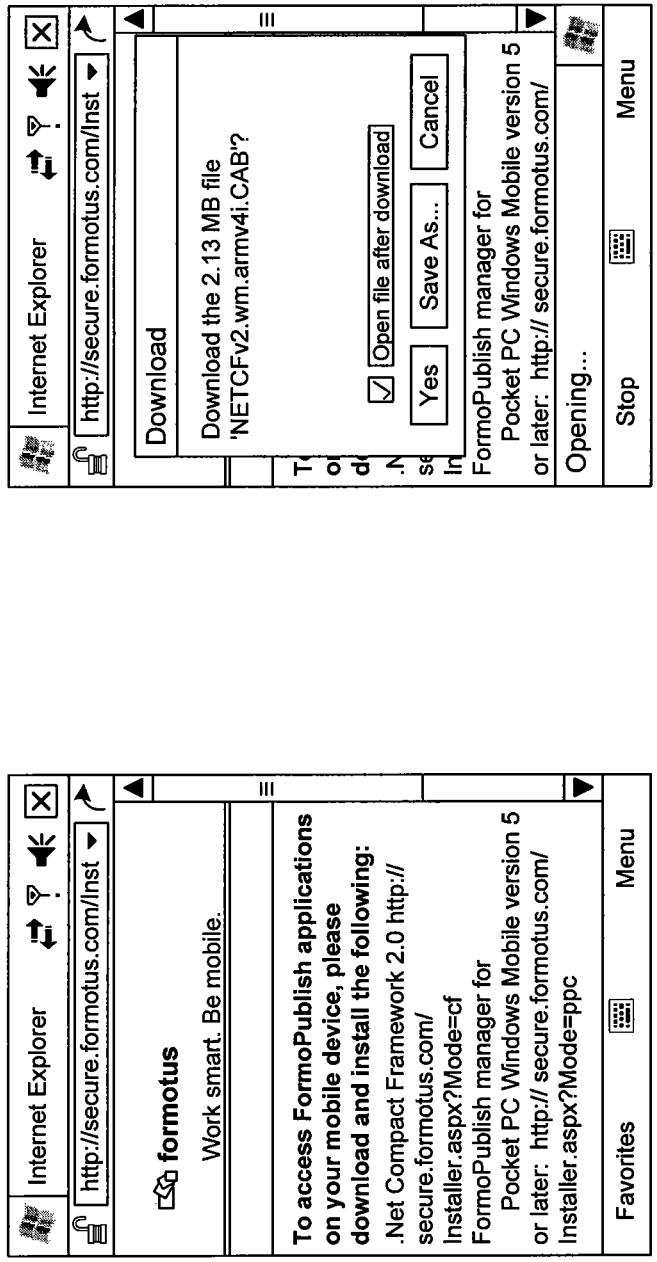

FORMS CONVERSION AND DEPLOYMENT SYSTEM FOR MOBILE DEVICES

CROSS-REFERENCE TO RELATED APPLICATION(S)

This application claims the benefit of U.S. Provisional Patent Application No. 60/892,493, entitled "FORMS CONVERSION AND DEPLOYMENT SYSTEM FOR MOBILE DEVICES," filed Mar. 1, 2007, which application is hereby incorporated by reference in its entirety.

BACKGROUND

Many organizations have developed extensive forms for desktop computers to support the functions of the organizations. For example, medical service providers have developed and use forms to support virtually every aspect of medical services, including forms to support patient registration, medical record-keeping, insurance claim processing, inventory control, appointment scheduling, and so on. Many products are available to facilitate the process of creating a form for a desktop computer. One popular forms development tool is InfoPath by Microsoft Corporation. An organization can use a forms development tool to generate forms that include various form controls, such as radio buttons, textboxes, and drop-down lists. The forms development tools may allow validation and allow an organization to provide business logic to be performed as a user interacts with the form. The forms development tools also allow rules and conditional formatting to guide the user in completing a form, including the ability to show or hide optional form sections based on information entered. The forms development tools also allow forms to access various data sources, such as a database server or a web service provider.

After a form is created, forms development tools create a forms file that contains the information needed to run the form on virtually any desktop computer. For example, InfoPath creates a forms file in an XSN format that contains a manifest file, a view file, a template file, and a schema definition file. The manifest file contains a listing of all other files in the forms file and several other details including metadata, information on toolbars and menus associated with each view, information on external data sources, and error messages. A view file is an eXtensible Stylesheet Language Transformation ("XSLT") transform that presents an editable view of a portion of data in an eXtensible Markup Language ("XML") format. Each view file accepts XML data as input and produces an output format similar to a HyperText Markup Language ("HTML") format. The schema file is an XML Schema Definition ("XSD") file that defines the XML format of the XML data that can be processed by the view file. If the XML data does not conform to the schema, the view file will not process the form. The template file contains initial data for the form in XML format. A forms file may also include a script file that contains scripts specified by the form developer for performing business logic and other validation.

The workforces of organizations are increasingly using mobile devices (e.g., smart phones and PDAs) to collect and access the data of the organization. For example, a medical service provider may carry a handheld device to collect physiological information about the patient. Unfortunately, mobile devices may not have the software to directly execute forms generated for a desktop computer, may not have the computation power to effectively process the forms, and may not be able to effectively display such forms on their small screens. It can be very expensive, however, to port desktop forms to mobile devices. It is expensive to support the manpower to develop and maintain the forms for the mobile devices and the infrastructure to support the deployment of such forms to the mobile devices.

BRIEF DESCRIPTION OF THE DRAWINGS

FIGS. 15-1 through 15-23 illustrate various user interfaces of the form systems in some embodiments.

DETAILED DESCRIPTION

Figure 1:
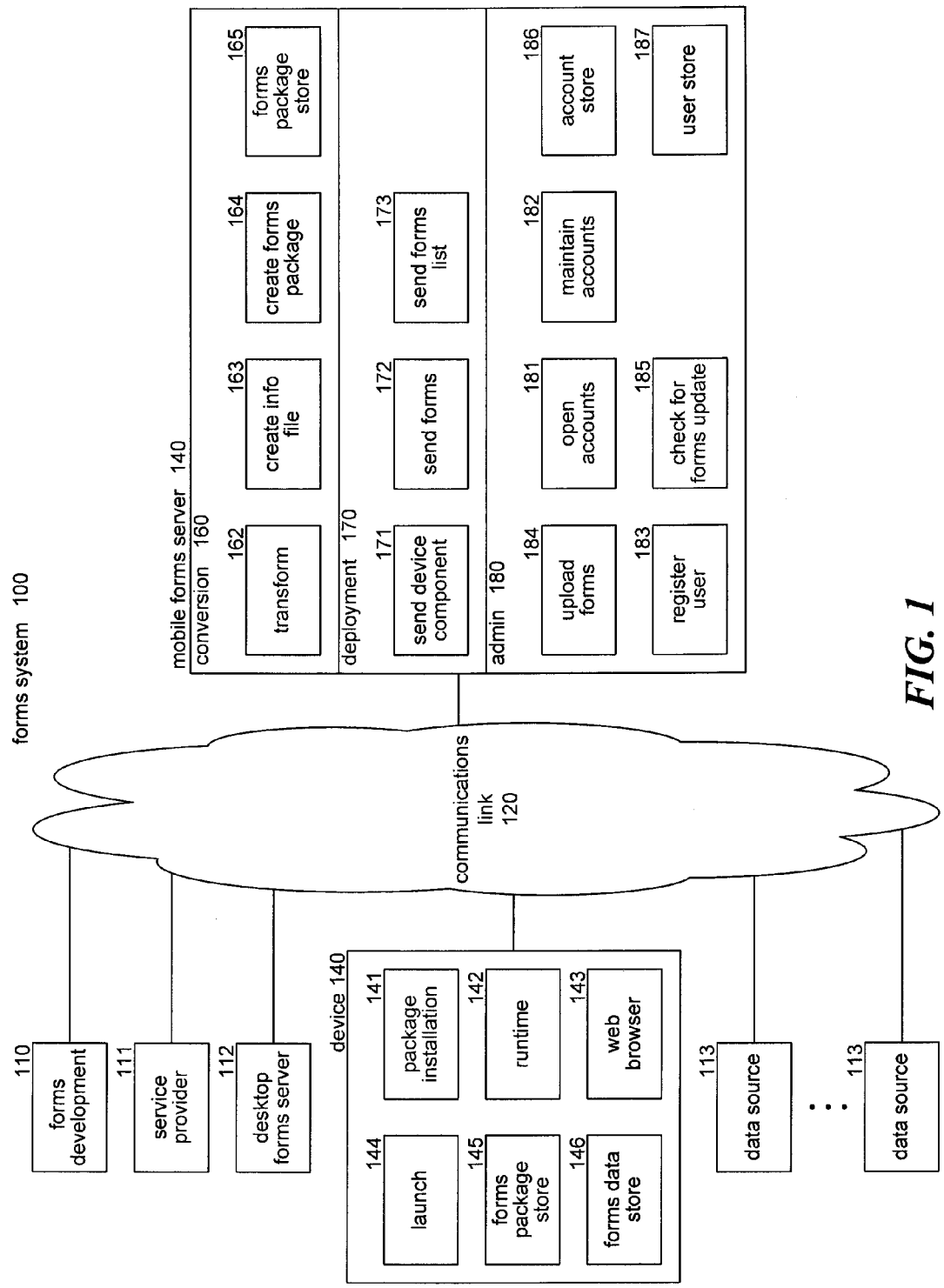
FIG. 1 is a block diagram illustrating components of the forms system in one embodiment.

A method and system for automatically converting forms generated using a desktop forms development tool to be compatible with mobile devices, for deploying the converted forms to the mobile devices, and for running converted forms on the mobile devices is provided. In one embodiment, a forms system provides an administrative component, a conversion component, a deployment component, and a device component as described below. The administrative component, the conversion component, and the deployment component execute on a mobile forms server, and the device component executes on a mobile device. In the following, the forms system is described with reference to the forms definition files ("forms files") generated by Infopath. One skilled in the art, however, will appreciate that the forms system can be adapted to the forms files of other desktop form development tools. A forms developer defines the data (e.g., schema) to be used by a form, defines one or more views for display of the data, defines rules and data validation, and defines where the data of the form is to be submitted for storage. Some views of the form are adapted for the screen characteristics of the mobile devices, and other views may be adapted for the screen characteristics of desktop devices. The forms file is generated by the desktop form development tool to be processed by a forms display program on a variety of devices. The forms system transforms the forms file to a target form definition file designed for execution by a target forms display program on a device of the target device type.

The mobile forms server deploys the converted forms to mobile devices so that the forms can be used to collect data from users of the mobile devices. The data collected by the mobile devices, however, are not set to the mobile forms server. Rather, the forms developer designates where the collected data is to be submitted for storage. For example, the forms developer may designate that the data is to be sent via an electronic mail message to a designated address, sent to a server using a web services interface, or sent via a short message services ("SMS"). Since the submitted data is sent as designated by the forms developer, the forms system does not serve as a bottleneck for receiving, storing, and/or routing the submitted data.

In some embodiments, the administrative component of the forms system allows forms generated using a desktop forms development tool to be uploaded to the mobile forms server for conversion and deployment. The administrative component may upload forms from a desktop computer or from a desktop form server, such as Microsoft's Sharepoint system. For example, a forms developer can design a form using InfoPath and store the form on a Sharepoint server. The administrative component can then upload the form from the Sharepoint server to the mobile forms server and convert it for use by a mobile device. After a form is uploaded, the administrative component may periodically and automatically check the desktop forms server to determine whether a new version of a form is available. If so, the administrative component uploads the new version for conversion and deployment. As discussed below, the device component of a mobile device may itself periodically check the mobile forms server to determine whether a new version of form that has been installed at the mobile device is available. If so, the device component provides the user with the option of downloading the new version.

In some embodiment, a form that is uploaded from a desktop forms server may be configured to submit data entered by a user of a mobile device to the desktop forms server for storage. Once data from a mobile device is stored on the desktop forms server, a user at the desktop forms server can use the form (that was converted and deployed to the mobile device) to display the stored data. Thus, the forms system allows for a seamless integration between the desktop forms server, the mobile forms server, and the mobile devices with the device component. One skilled in the art will appreciate that the desktop forms server and the mobile forms server may be implemented on the same computer system or different computer systems.

The conversion component of the forms system transforms the files of the forms file so that the form can be processed by a mobile device. Typical mobile devices provide web browser components that support only a subset of the functionality supported by web browser components of desktop computers. For example, Pocket Internet Explorer does not support all the functionality of Internet Explorer for desktop computers. The conversion component inputs a forms file generated by a desktop forms development tool and transforms the view file of the forms file so that it uses only the functionality supported by the web browser component of a mobile device. In addition, a forms file may contain multiple view files that are each tailored to a particular type of device. For example, a smart phone may have a very small screen, while a custom-developed handheld device may have a significantly larger screen. In such a case, the forms file may contain two view files: one for the smart phone and one for the custom-developed handheld device. The conversion may also preprocess certain features of a form to reduce the computation needed when the form is processed by the device. For example, the conversion system may add menu items and items of a drop-down list directly to the converted view file to avoid the overhead of locating and retrieving such items by the device. The conversion system may transform the view file so that whenever a field is changed, the controls affected by the change are incrementally updated. The conversion system also creates an information file that collects into a single place information such as mapping of controls to fields and data source connection information. The conversion system then generates a forms package for each view file. A forms package contains the transformed view file, the information file, and the schema file in a format that is suitable for distribution to the type of device for which the view file was generated.

The conversion component may allow a forms developer to add features, not made available by the desktop forms development tool, to the form for a mobile device. For example, many mobile devices have global positioning system ("GPS") capabilities through which GPS coordinates of the mobile device can be obtained via an application programming interface. However, a typical desktop forms development tool provides no support for GPS coordinates. The conversion component may provide custom controls that can replace "placeholder" controls specified by a forms developer. The custom controls provide the functionality to access features of a mobile device. For example, a forms developer may add a "placeholder" GPS control to a form. When the conversion component process that GPS control, it replaces the functionality of the control with functionality to retrieve the GPS coordinates and display the coordinates as specified by the control. The forms system may also allow a forms developer to define their own custom controls to override the corresponding "placeholder" controls. In this way, the forms system allows forms developers to take advantage of features of a mobile device that are not supported by the desktop forms development tool.

The conversion component may provide support allowing a form to input data via electronic ink strokes. For example, a forms developer may want add a signature field to a form so that the user can enter their signature. Although some desktop forms development tools provide controls for capturing and storing electronic ink strokes as part of a form, the tools typically store the ink strokes in a proprietary format. Because the format is proprietary, most mobile devices do not support the storing of ink strokes in that format. The conversion system provides a custom ink control that provides the functionality to collect and store electronic ink in a format that is compatible with the desktop forms development tools and desktop forms servers (e.g., a Sharepoint server). In some embodiments, the ink control collects the electronic ink as strokes provided by an application programming interface of the mobile device. The ink control then converts the ink strokes to an image file (e.g., JPEG) and stores the image file as part of the data of the form. When the data of the form is re-displayed, the image file is displayed to show the electronic ink. When the user submits the form to a desktop forms server, the desktop form can also display the image file to show the electronic ink. Thus, by using an image file to store electronic ink, the forms system allows for collection and display of ink strokes in a way that is compatible with both the desktop and mobile forms without having to use a proprietary form.

In some embodiment, the forms system may also allow a forms developer to designate a default view for a form. Some desktop forms development tools allows the forms developer to designate a default view for the form. The default view is the view that is initially displayed when the form is displayed. The forms developer may designate as a default view a view that is appropriate for display on a desktop. For example, if the form is uploaded to a desktop forms server, the forms developer would want the user to see a view that is appropriate for a desktop. Such a view, however, may not an appropriate initial view for a mobile device. To overcome this problem, the forms system allows the forms developer to name a view with a distinguished name that the forms system recognizes. For example, the distinguished name of a view may "mobile default." The forms system ensures that the view with such a distinguished name will be the default view on the mobile device. In this way, the forms system allows a different default view on a desktop device and a mobile device without having to modify the desktop forms development tool or the desktop forms server. Alternatively, the conversion component may give a user the option of selecting a default view at conversion time, rather than, or in addition to, allowing a forms developer to specify the default view at design time.

The deployment component of the forms system controls the distribution of forms packages to the devices. The deployment component maintains a collection of forms packages along with their associated device types. For example, the deployment component may have one forms package for a form for a smart phone and another forms package for that same form for a PDA. The deployment component may also have one forms package for another form for a smart phone and another forms package for that other form for a PDA. When the deployment system receives a request for a form update from a user's device, the deployment system identifies the device type (e.g., by checking the user-to-device mapping or directly from the device), identifies the forms that the user has permission to access (e.g., by checking the user-to-forms mapping), and retrieves the forms package for each accessible form for which the user's device does not have an up-to-date version. The deployment system then transmits the retrieved forms to the device. The deployment system may also allow a user to register to receive forms. As part of the registration process, the deployment system may provide the device of the user with a package installation component that allows the device to request, receive, and install forms on the device. The package installation component may also include the device component, which processes the forms at the device. The device component includes a manager component that is responsible for downloading the forms packages.

The device component of the forms system controls the display of the forms on the device and the accessing of the data sources described by a forms package. In one embodiment, the device component includes a runtime component that interacts with a web browser component (e.g., HTML control) to display the form of a forms package. When a user selects to display a form that has been installed on a device, the runtime component is launched. The runtime component then launches a web browser component to process the form of the transformed view file of the forms package. The runtime component registers to receive various events from the web browser component. For example, each form may include a save or submit button. When a user selects the submit button, the web browser component notifies the runtime component that the submit button was selected. In such a case, the runtime component may save the data of the form to a data source defined by the forms package. The runtime component may also persistently store the data of a form locally. Because the data is stored locally, a user can access the data of a form even when a connection cannot be established with a data source. When a connection with the data source is eventually established, the runtime component can then save the data to the data source. Once the save to the data source is confirmed, the device component may automatically delete the data from the mobile device. Each forms package may include a launch component that is executed when a form is selected. The launch component is responsible for launching the runtime component to process the selected form. The user may select a form by selecting an icon representing the form that may be included in the forms package for the form. If the runtime component is already running, the launch component may direct the runtime component to start processing the new forms package. In such a case, the runtime component stores the data for the previous form locally so that it can be available when the user returns to the previous form. The runtime component may also track various information on the use of the forms packages and report that information to the mobile forms server system or a reporting system. The collected information may include statistics on usage of forms, error logs, and so on.

In some embodiments, the device component may maintain a list of data that has been submitted by the user, but that has not been successfully sent to the data source designated by the form through which the data was collected. When a user submits data, it may not be possible for the device to send the data to the data source immediately for various reasons. One reason may be that the mobile device is in an area where connectivity is unreliable. Another reason may be that the data source may currently not be available. Yet another reason may be that the user has entered the wrong authentication information for the data source (e.g., an expired password). The device component stores each submission in submission list where it waits until it can be successfully sent to its data source. The device component periodically processes each entry in the list to see if the data can be sent. If the data for an entry can be sent, the device component removes the entry from the list.

The device component may allow a user to store the data of a form locally at the mobile device until the user is ready to submit the data for a data source. For example, a user may have most, but not all, of the information needed to complete a form. In such a case, the user may want add the currently available data to the form and store that data at the mobile device so that the remaining data can be added at a later time. Since a user may want to store multiple instances of the data of a form, the user needs some way to distinguish one instance from another. Although the device component could prompt the user to enter an instance name for each instance of the data of a form, the user of mobile devices often find it difficult to entry alphanumeric characters. Some desktop forms servers allow a forms designer to specify a rule for automatically generating unique names for instances of data. For example, one rule may specify to concatenate the content of a last name field, a first name field, and a middle initial field of a form to give a unique instance name, and another rule may specify to concatenate the content of a customer identifier field and a service representative field of a form to give the unique instance name. The desktop forms server can store the instance data in a file with the automatically generated instance name. When a form has such a rule, the device component may use that rule to generate instance names to store instances of data on the mobile device. If a certain form, however, has no such rule, the device component may automatically generate an instance name based on the concatenation of an identifier of the form (e.g., form name) and a sequence identifier (e.g., time stamp or sequentially generated number). The device component may display a list of the instance names for the instances of data of a form so that a user can identify the instance to be displayed by the form. Thus, the device component uses a rule associated with the form if available to generate an instance name, otherwise it generates an instance name from an identifier of the form and a sequence identifier.

The device component may allow a user to access data that has already been stored on a data source and deleted from the mobile device. The device component may retrieve from the data source a list of the instances of the data stored on the data source and display that list to the user. Once the user selects an instance, the device component downloads the data from the data source and allows the user to view and possibly modify the data using the form. When the user later submits the data, then the device component sends the modified data to the data source as described above to overwrite the previously submitted instance of the form data at the data source. In some embodiments, the forms system may automatically add, during conversion of a form, the functionality to download a list of instances of data of the form and the data itself from a data source. This functionality may be added as menu items to a standard menu that is automatically provided by the forms system when a form is displayed. During conversion, the conversion component may detect that a form has the functionality to submit data for a desktop forms server with an overwrite option and the functionality to send a query to the same desktop forms server. If so, the conversion component can add a menu item to the form to view a list of instances of data stored on the desktop forms server. The conversion component can simply add another menu item (e.g., "See List") to the menu. When the user selects the menu item, the device component uses the query connector to submit a request to the desktop forms server. Upon receiving the list, the device component displays the list to the user so that the user can select one more instances of the data to download. Once the instances are downloaded, the user can select which instance to view and possibly modify using the form.

In one embodiment, the conversion component initially expands the forms file into the manifest file, schema files, views files, and template files. The conversion component then creates the information file by extracting and converting data from the expanded files. The conversion component extracts menu items, mappings of controls to underlying data fields, submit and query information, schema information, web services information, views, rules, custom validation, and so on. The extraction of this data at conversion time, rather than runtime, reduces the computational power needed by the device. Transformations of the conversion component are implemented using XSLT transforms that operate successively to transform a view file to a transformed view file and to generate the information file. The XSLT transforms perform various specific transformations on the body elements, textboxes, checkboxes, radio buttons, hyperlinks, and buttons, and performs general transformations on all controls. To the body elements, the conversion component adds an element to reference the script file, adds a language attribute for the script file, adds a form element with a form identifier, adds hidden fields under the forms element to store state information at runtime, and adds onload and onunload attributes. The conversion component then generates a forms package that may contain the original files of the forms file along with the transformed view file and the created information file. The conversion component may also add a launch executable component to the forms package to launch the form when an icon representing the form is selected by a user of the device. The conversion component then stores the forms package in a forms package store along with an indication of the type of device that each forms package supports.

The following tables illustrate example transformations performed by the conversion system to generate the transformed view file and the information file. The following table illustrates an example script element that references the script file that is added to a body element.

```
<script
    language="jscript">
    function ValidateAll( )
    {if(document.Form1.CTRL1!=null)
        {ValidateSchema('CTRL1','string','view1.xsl');}
    if(document.Form1.CTRL2!=null)
        {ValidateSchema('CTRL2','string','view1.xsl');}
    }
</script>
```

The following table illustrates a form element with a form identifier that is added to a body element.

```
<form
    id="Form1"
    name="Form1"
    method="POST"
    action="\template.xml"
    onsubmit="jscript:return IsSubmit;"
>
```

The following table illustrates an example hidden field used by the runtime component in processing errors that is added to a body element.

```
<input
    type="hidden"
    id="ftHiddenError"
    name="ftHiddenError">
</input>
```

The following table illustrates an onload attribute added to a body element.

```
<body
    onload="SetFocusOnLoad("view1.xsl");
    "   ="BodyOnUnload( );"
</body>
```

The conversion component transforms textboxes by transforming span elements to input elements and, when text wrapping is used as a style attribute, converting span elements to textarea elements. Also, if any maxlength value is given, the conversion component adds a maxlength attribute. The conversion component also adds a rows attribute to textarea elements. The following table illustrates the transformation of a span element to a textarea element.

```
Before
<span
   class="xdTextBox"
   hideFocus="1"
   title=""
   contentEditable="true"
   xd:binding="/my:myFields/my:field1"
   xd:CtrlId="CTRL1"
   size="20">
   <xsl:attribute name="style">
      OVERFLOW-Y: scroll; WIDTH: 130px; WHITE-SPACE: normal;
      WORD-WRAP: break-word;
   </xsl:attribute>
   <xsl:value-of select="my:field1"> </xsl:value-of>
</span>
After
<textarea
   name="CTRL1"
   id="CTRL1"
   class="xdTextBox"
   type="text"
   xd:binding="/my:myFields/my:field1"
   xd:CtrlId="CTRL1"
   size="20"
   rows="2"
   onFocus="SetControlFocus("CTRL1");">
   <xsl:attribute name="style">
      OVERFLOW-Y: scroll; WIDTH: 130px; WHITE-SPACE: normal;
      WORD-WRAP: break-word;
   </xsl:attribute>
</textarea>
```

The following table illustrates the transformation of a span element to an input element.

```
Before
<span
   class="xdTextBox"
   hideFocus="1"
   title=""
   contentEditable="true"
   xd:binding="/my:myFields/my:text2"
   xd:CtrlId="CTRL2" size="20">
   <xsl:attribute name="style">
      WIDTH: 130px; WHITE-SPACE: nowrap; WORD-WRAP: normal;
   </xsl:attribute>
   <xsl:value-of select="my:text2"></xsl:value-of>
</span>
After
<input
   name="CTRL2"
   id="CTRL2"
   class="xdTextBox"
   onchange="CTRL2onChange( );"
   type="text"
   xd:binding="/my:myFields/my:text2"
   xd:CtrlId="CTRL2"
   size="20"
   onFocus="SetControlFocus("CTRL2");">
   <xsl:attribute name="style">
      WIDTH: 130px; WHITE-SPACE: nowrap; WORD-WRAP: normal;
   </xsl:attribute>
   <xsl:attribute name="value">
      <xsl:value-of select="my:text2"></xsl:value-of>
   </xsl:attribute>
</input>
```

The conversion component transforms a checkbox by adding onValue and offValue attributes. The following table illustrates the transformation of a checkbox element.

```
Before
<div>
   <input
      class="xdBehavior_Boolean"
      title=""
      type="checkbox"
      xd:xctname="CheckBox"
      xd:CtrlId="CTRL1"
      xd:binding="/my:myFields/my:field1"
      xd:onValue="true"
      xd:offValue="false"
      xd:boundProp="xd:value"
      tabIndex="0">
      <xsl:attribute name="xd:value">
         <xsl:value-of select="my:field1"></xsl:value-of>
      </xsl:attribute>
      <xsl:if test="my:field1="true"">
         <xsl:attribute name="CHECKED">CHECKED</xsl:attribute>
      </xsl:if>
   </input> Checkbox text
</div>
After
<div>
   <input
      name="CTRL1"
      id="CTRL1"
      onchange="CTRL1onChange( );"
      type="checkbox"
      onValue=""true""
      offValue=""false""
      value="true"
      xd:binding="/my:myFields/my:field1"
      onclick="OnClickFunction"
      class=""
      xd:CtrlId=""
      onFocus="SetControlFocus("CTRL1");">
      <xsl:if test=".[my:field1="true"]">
         <xsl:attribute name="CHECKED">CHECKED</xsl:attribute>
      </xsl:if>
   </input> Checkbox text
</div>
```

The conversion component transforms a radio button by adding a value and an onClick attribute. The following table illustrates the transformation of a radio button.

```
Before
<input
   class="xdBehavior_Boolean"
   title=""
   type="radio"
   name="{generate-id(my:field25)}"
   xd:xctname="OptionButton"
   xd:CtrlId="CTRL39"
   xd:binding="/my:myFields/my:field25"
   xd:onValue="1"
   xd:boundProp="xd:value"
   tabIndex="0">
After
<input
   name="CTRL39"
   onchange="CTRL39onChange( );"
   type="radio"
   id="CTRL39"
   value="1"
   xd:binding="/my:myFields/my:field25"
   onclick="OnClickFunction( )"
   class=""
   xd:CtrlId=""
   onFocus="SetControlFocus("CTRL39");">
```

The conversion component converts a hyperlink by adding an href attribute if it does not exist. The following table illustrates the transformation of a hyperlink.

```
Before
<a
    class="xdDataBindingUI"
    xd:CtrlId="CTRL4"
    xd:disableEditing="yes">
    <xsl:attribute name="href">
        <xsl:value-of select="url"></xsl:value-of>
    </xsl:attribute>
    <xsl:value-of select="."></xsl:value-of>
</a>
After
<a
    class="xdDataBindingUI"
    xd:CtrlId="CTRL4"
    xd:disableEditing="yes">
    <xsl:attribute name="href">#url
        <xsl:value-of select="."></xsl:value-of>
    </xsl:attribute>
    <xsl:value-of select=".">
    </xsl:value-of>
</a>
```

The conversion component transforms a button by adding an onClick attribute. The following table illustrates transformation of a button.

```
Before
<input
    class="langFont"
    title=""
    type="button"
    value="Button"
    xd:xctname="Button"
    xd:CtrlId="CTRL11_5"
    tabIndex="0"
    ftRuleName="ruleSet_2">
</input>
After
<input
    class="langFont" type
    ="button"
    value="Button"
    id="CTRL11_5"
    onclick="OnClickFunction">
</input>
```

The conversion component transforms controls by adding name and id attributes, adding a disable attribute when a disableEditing attribute is yes, converting an xsl:when element to an xsl:if element, adding onchange attributes depending on validation rules, adding an xsl:if element inside the control for highlighting the control (e.g., displaying a red border) on occurrence of an error, and adding an onFocus attribute. The following table illustrates the transformation of a control by adding a name and an id attribute.

```
<input
    name="CTRL2"
    id="CTRL2"
    class="xdTextBox"
    type="text"
    xd:binding="/my: myFields/my:text2"
    xd:CtrlId="CTRL2" size="20"
/>
```

The following table illustrates the transformation of a control by adding an onchange attribute.

```
<input
    name="CTRL2"
    id="CTRL2"
    class="xdTextBox"
    onchange="CTRL2onChange( );"
    type="text"
    xd:binding="/my:myFields/my:text2"
    xd:CtrlId="CTRL2"
    size="20"
>
```

The following table illustrates the transformation of a control for highlighting the control upon occurrence of an error.

```
<input
    name="CTRL2"
    id="CTRL2"
    class="xdTextBox"
    onchange="CTRL2onChange( );"
    type="text"
    xd:binding="/my:myFields/my:text2"
    xd:CtrlId="CTRL2"
    size="20"
    onFocus="SetControlFocus("CTRL2");"
>
<xsl:attribute name="style">
    WIDTH: 130px; WHITE-SPACE: nowrap; WORD-WRAP: normal;
    <xsl:if test="my:text2/@error[.="Error"]">
        border-style:dashed; border-color:red; border-width:2;
    </xsl:if>
</xsl:attribute>
<xsl:attribute name="value">
    <xsl:value-of select="my:text2"></xsl:value-of>
</xsl:attribute>
</input>
```

The following table illustrates the transformation of a control by adding an onFocus attribute.

```
<input
    name="CTRL2"
    id="CTRL2"
    class="xdTextBox"
    type="text"
    xd:binding="/my:myFields/my:text2"
    xd:CtrlId="CTRL2"
    size="20"
    onFocus="SetControlFocus("CTRL2");"
/>
```

The conversion component also extracts data from the various files of the forms file and stores them in the information file in a format that allows the device component to retrieve more efficiently at runtime. The conversion component converts web services related information from the manifest file. The following table illustrates the extraction and transformation of a default query for a web service.

```
Before
<xsf:query>
  <xsf:webServiceAdapter
    wsdlUrl="http://services.aonaware.com/CountCheatService/CountCheatService.asmx?WSDL"
    queryAllowed="yes"
    submitAllowed="no"
    name="Main query">
    <xsf:operation
        name="LetterSolutionsMin"
        soapAction="http://services.aonaware.com/webservices/LetterSolutionsMin"
    serviceUrl="http://services.aonaware.com/CountCheatService/CountCheatService.asmx">
    </xsf:operation>
  </xsf:webServiceAdapter>
</xsf:query>
After
<WebServiceQuery
  name="Main query"
  default="yes"
  source=""
  onLoad="no"
  viewName="">
  <URL>http://services.aonaware.com/CountCheatService/CountCheatService.asmx</URL>
  <SOAPAction>http://services.aonaware.com/webservices/LetterSolutionsMin</SOAPAction>
  <QueryFieldPrefixNamespace>
      http://schemas.microsoft.com/office/infopath/2003/dataFormSolution
  </QueryFieldPrefixNamespace>
</WebServiceQuery>
```

The following table illustrates the extraction and transformation of a query for a secondary data source.

```
Before
<xsf:dataObjects>
  <xsf:dataObject
    name="StringArrayReturnTest"
    schema="StringArrayReturnTest.xsd"
    initOnLoad="yes">
    <xsf:query>
      <xsf:webServiceAdapter
        wsdlUrl="http://sudhir/examonline/testService.asmx?WSDL"
        queryAllowed="yes"
        submitAllowed="no"
        name="StringArrayReturnTest">
        <xsf:operation
            name="StringArrayReturnTest"
            soapAction="http://tempuri.org/StringArrayReturnTest"
            serviceUrl="http://sudhir/examonline/testService.asmx">
          <xsf:input
              source="StringArrayReturnTest.xml">
          </xsf:input>
        </xsf:operation>
      </xsf:webServiceAdapter>
    </xsf:query>
  </xsf:dataObject>
</xsf:dataObjects>
After
<Query>
  <WebServiceQuery
    name="StringArrayReturnTest"
    default="no"
    source="StringArrayReturnTest.xml"
    onLoad="yes"
    viewName="view1.xsl">
    <URL>http://sudhir/examonline/testService.asmx</URL>
    <SOAPAction>http://tempuri.org/StringArrayReturnTest</SOAPAction>
    <QueryFieldPrefixNamespace>
        http://schemas.microsoft.com/office/infopath/2003/
        dataFormSolution
    </QueryFieldPrefixNamespace>
  </WebServiceQuery>
</Query>
```

The following table illustrates the extraction and transformation of a default submission for a web service.

```
Before
<xsf:submit caption="Su&bmit">
  <xsf:webServiceAdapter
    wsdlUrl="http://services.aonaware.com/CountCheatService/CountCheatService.asmx?WSDL"
    queryAllowed="no"
    submitAllowed="yes"
    name="Main submit">
    <xsf:operation name="LetterSolutionsMin"
        soapAction="http://services.aonaware.com/webservices/LetterSolutionsMin"
    serviceUrl="http://services.aonaware.com/CountCheatService/CountCheatService.asmx">
        <xsf:input
            source="Submit.xml">
          <xsf:partFragment
          match="/dfs:myFields/dfs:dataFields/tns:LetterSolutionsMin/tns:anagram"
          replaceWith="/dfs:myFields/dfs:queryFields/tns:LetterSolutionsMin/tns:anagram">
          </xsf:partFragment>
          <xsf:partFragment
          match="/dfs:myFields/dfs:dataFields/tns:LetterSolutionsMin/tns:minLetters"
          replaceWith="/dfs:myFields/dfs:queryFields/tns:LetterSolutionsMin/tns:minLetters">
```

```
                </xsf:partFragment>
            </xsf:input>
        </xsf:operation>
    </xsf:webServiceAdapter>
</xsf:submit>
After
<WebServiceSubmit
    name="Main submit"
    default="yes"
    source="Submit.xml">
    <URL>http://services.aonaware.com/CountCheatService/CountCheatService.asmx</URL>
    <SOAPAction>http://services.aonaware.com/webservices/LetterSolutionsMin</SOAPAction>
    <SubmitFieldPrefixNamespace>
        http://schemas.microsoft.com/office/infopath/2003/dataFormSolution
    </SubmitFieldPrefixNamespace>
    <PartFragment
        match="/dfs:myFields/dfs:dataFields/tns:LetterSolutionsMin/tns:anagram"
        replaceWith="/dfs:myFields/dfs:queryFields/tns:LetterSolutionsMin/tns:anagram">
    </PartFragment>
    <PartFragment
        match="/dfs:myFields/dfs:dataFields/tns:LetterSolutionsMin/tns:minLetters"
        replaceWith="/dfs:myFields/dfs:queryFields/tns:LetterSolutionsMin/tns:minLetters">
    </PartFragment>
</WebServiceSubmit>
```

The following table illustrates extraction and conversion of submit form data adapter for a rule.

```
Before
<xsf:webServiceAdapter
    wsdlUrl="http://ft-india.com/PocketInfopath/Service.asmx?WSDL"
    queryAllowed="no" submitAllowed="yes" name="Main submit">
    <xsf:operation
        name="SubmitAndReceive"
        soapAction="http://tempuri.org/SubmitAndReceive"
        serviceUrl="http://ft-india.com/PocketInfopath/Service.asmx">
        <xsf:input
            source="Submit.xml">
            <xsf:partFragment
                match="/dfs:myFields/dfs:dataFields/tns:SubmitAndReceive/tns:action"
                replaceWith="/dfs:myFields/dfs:queryFields/tns:SubmitAndReceive/tns:action">
            </xsf:partFragment>
            <xsf:partFragment
                match="/dfs:myFields/dfs:dataFields/tns:SubmitAndReceive/tns:msg"
                replaceWith="/dfs:myFields/dfs:queryFields/tns:SubmitAndReceive/tns:msg">
            </xsf:partFragment>
            <xsf:partFragment
                match="/dfs:myFields/dfs:dataFields/tns:SubmitAndReceive/tns:count"
                replaceWith="/dfs:myFields/dfs:queryFields/tns:SubmitAndReceive/tns:count">
            </xsf:partFragment>
        </xsf:input>
    </xsf:operation>
</xsf:webServiceAdapter>
After
<WebServiceSubmit
    name="Main submit"
    default="no"
    source="Submit.xml">
    <URL>http://ft-india.com/PocketInfopath/Service.asmx</URL>
    <SOAPAction>http://tempuri.org/SubmitAndReceive</SOAPAction>
    <SubmitFieldPrefixNamespace>
        http://schemas.microsoft.com/office/infopath/2003/dataFormSolution
    </SubmitFieldPrefixNamespace>
    <PartFragment
        match="/dfs:myFields/dfs:dataFields/tns:SubmitAndReceive/tns:action"
        replaceWith="/dfs:myFields/dfs:queryFields/tns:SubmitAndReceive/tns:action">
    </PartFragment>
    <PartFragment
        match="/dfs:myFields/dfs:dataFields/tns:SubmitAndReceive/tns:msg"
        replaceWith="/dfs:myFields/dfs:queryFields/tns:SubmitAndReceive/tns:msg">
    </PartFragment>
    <PartFragment
        match="/dfs:myFields/dfs:dataFields/tns:SubmitAndReceive/tns:count"
```

-continued

```
        replaceWith="/dfs:myFields/dfs:queryFields/tns:SubmitAndReceive/tns:count">
    </PartFragment>
</WebServiceSubmit>
```

FIG. 1 is a block diagram illustrating components of the forms system in one embodiment. The forms system 100 includes a forms server 150 connected via communications link 120 to devices 140, forms development computers 110. The devices are also connected via the communications link to service provider servers 111, a desktop forms server 112, and data sources. The communications link may provide various modes of communication between the various computers (e.g., devices, servers, and desktops) such as via the Internet, a Wi-Fi network, or other wireless network. The mobile forms server 150 includes a conversion component 160, a deployment component 170, and an administrative component 180. The administrative component includes an open accounts component 181, a maintain accounts component 182, a register user component 183, an upload forms component 184, a check for forms update component 185, an account store 186, and a user store 187. The open accounts component allows an overall administrator to define accounts having account administrators. The maintain accounts component allows each account administrator to upload forms to the account and specify which registered users are authorized to use the forms of the account. The register users component allows users to be registered. The upload forms component allows an account administrator to upload forms to the account. The check for forms update component automatically checks for new versions of forms. The account store includes an entry for each account. Each entries include an account identifier (e.g., electronic mail address), a list of authorized users (e.g., identified by electronic mail address), a list of forms of the account, and a list of each user and device combination that is using the account. The user store includes an entry for each registered user.

When a registered user is authorized to use an account, an electronic mail message is sent to the user with instructions on downloading the device component of the forms system onto their mobile device and the forms of the account. The administrative system tracks the device identifier that the user uses to access the mobile forms server. Thus, the mobile forms server has a mapping for each account of the users who are using the account (e.g., identified by their electronic mail address) and their device identifier. In some embodiment, the forms system may charge an account on a per-user/device combination. For example, if a user uses an account using two different devices, then the account would be charged for two uses. Similarly, if two different users with different user identifiers (e.g., electronic mail addresses) use the account with the same device, then the account would also be charged for two uses. If, however, two different people used the same user identifier to access the account with the same device, then the account would be charged for only one use. One skilled in the art will appreciate that other billing models may be used. For example, the forms system may charge an account on a per-device or per-user basis, on a fixed-fee, and so on.

The conversion component includes a transform component 162, a create information file component 163, a create forms package component 164, and a forms package store 165. The transform component controls the transforming of the received forms files and creating of the forms packages. The create information file component is invoked by the transform component to create the information file for a forms package. The create form package component is invoked by the transform component to package the files of the forms packages. The transform component also stores the form packages in the forms package store. The forms packages are then available to be distributed to user devices by the deployment component.

The deployment component includes a send device component component 171, a send forms component 172, a maintain mapping component 173, a user-to-device mapping 174, and a user-to-forms mapping 175. The send device component component sends device component to mobile devices for installation. Once a user is registered with the deployment system, the user can download to their device forms packages that the user has permission to access. The send forms component receives a request from a device for a form, identifies the forms to send to the device, and downloads the forms to the device. The forms system may also maintain various auxiliary data structures such as those to track activity of registered users, check date of last update of a forms file, check date of last download by a user, and so on. The forms system may also receive and store information describing activity of users at their mobile devices such as forms usage, frequency of data submissions, and so on.

The device includes various device components such as a package installation component 141, a runtime component 142, a web browser component 143, a launch executable component 144, a forms package store 145, and a forms data store 146. The package installation component is provided to the device when the device registers with the deployment system. The package installation component is responsible for downloading forms packages and installing the forms on the device. The runtime component provides the overall control of the device component. The runtime component is passed an indication of an installed form and displays the form in accordance with the forms package by invoking the web browser component. The runtime component receives event notifications from the web browser component such as submit and query requests and controls the submission and querying based on information of the information file. The device component includes a launch executable component for each installed forms package. When an icon associated with a form is selected by a user, the launch executable component for that form directs the runtime component to display the form. The forms package store contains the form packages that have been downloaded to the device. The forms data store contains the data of the forms that have not yet been submitted for storage. The device component sends forms data to and retrieves data from the desktop forms server 112 or other data source 113. The data sources may include web services, electronic mail message servers, SMS servers, and so on. The device component may also request services of various service providers 111.

In some embodiments, the device component may include an uninstall component. When a user selects to uninstall the device component (e.g., by selecting to uninstall the runtime component), the device component automatically uninstalls all components of the device component, all forms, and all forms data. The uninstall component may display the name of each component, form, and instance data that is being deleted.

In this way, the uninstall component ensures that mobile device will have all resources of the device component removed.

The computing device on which the forms system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the forms system, which means a computer-readable medium that contains the instructions. In addition, the instructions, data structures, and message structures may be transmitted via a data transmission medium, such as a signal on a communication link. Various communication links may be used, such as the Internet, a local area network, a wide area network, a point-to-point dial-up connection, a cell phone network, and so on.

Embodiments of the forms system may be implemented in various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The forms system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the conversion component and the deployment component may be implemented on the same or separate servers.

Figure 2:
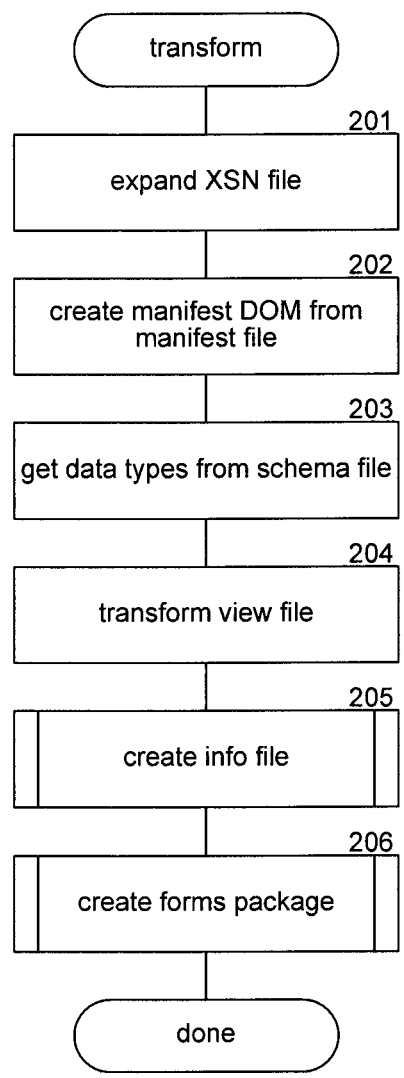
FIG. 2 is a flow diagram that illustrates the processing of the transform component of the conversion system in one embodiment.

FIGS. 2-7 are flow diagrams that illustrate the processing of components of the conversion component in one embodiment. FIG. 2 is a flow diagram that illustrates the processing of the transform component of the conversion system in one embodiment. The component is responsible for generating a forms package for each view file of a forms file. In block 201, the component expands the forms file into its constituent files. In block 202, the component creates a manifest document object model from the manifest file to facilitate accessing the information of the manifest file. In block 203, the component identifies the data types of the fields from the schema file. In block 204, the component transforms the view files. In block 205, the component invokes a create information file component to create the information file. In block 206, the component invokes a create forms package component to package the files into a forms package for each view file and then completes.

Figure 3:
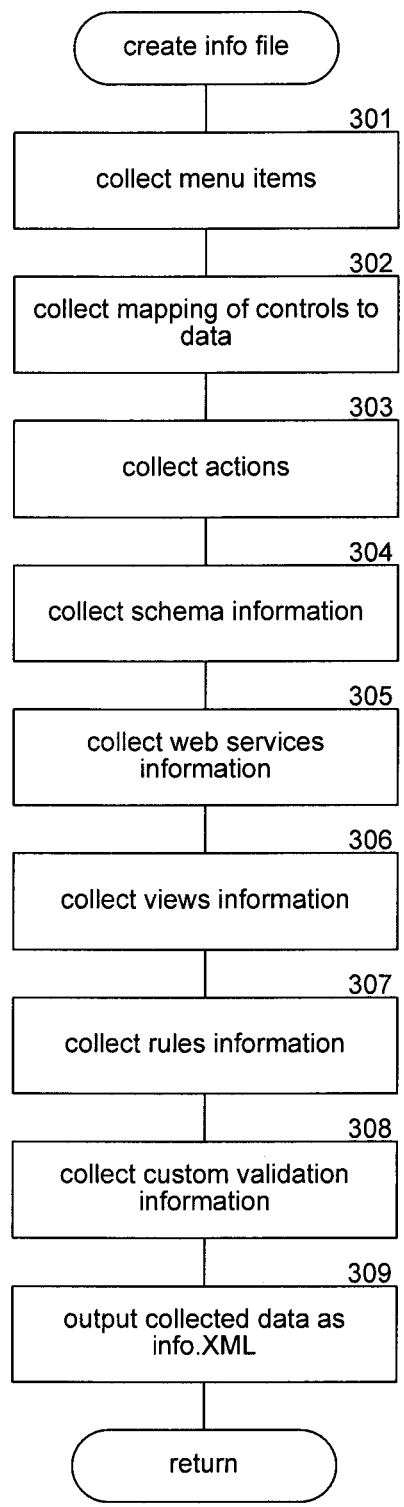
FIG. 3 is a flow diagram that illustrates the logical processing of the create information file component of the conversion component in one embodiment.

FIG. 3 is a flow diagram that illustrates the logical processing of the create information file component of the conversion component in one embodiment. The extraction and transformation of the information is performed by an XSLT transform. The component creates an information file that contains information in a format that is easier for the device to process. In block 301, the component collects the menu items of the form. In block 302, the component collects a mapping of the controls of the form to the data fields. In block 303, the component collects the actions of the form (e.g., submit). In block 304, the component collects schema information for the form. In block 305, the component collects web services information. In block 306, the component collects views information. In block 307, the component collects rules information for the form. In block 308, the component collects custom validation information. In block 309, the component outputs the collected data as an information file and then returns.

Figure 4:
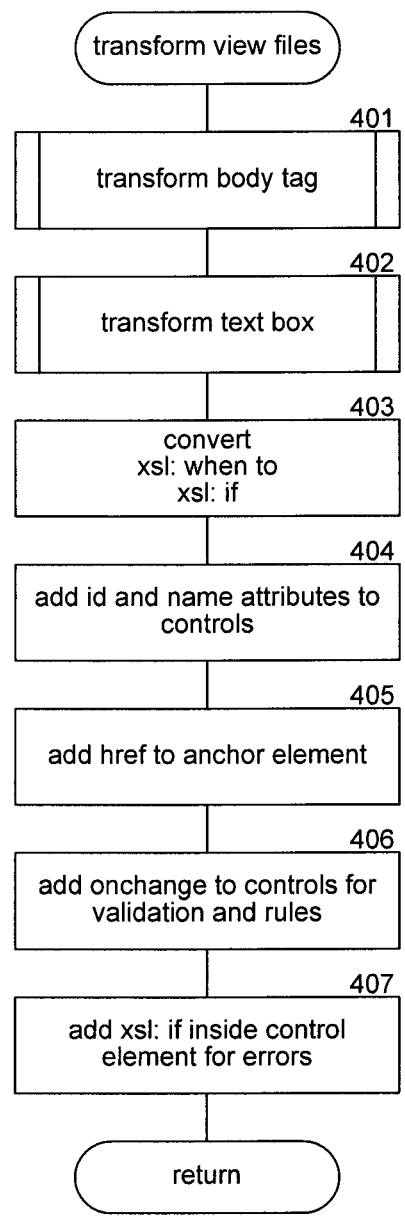
FIG. 4 is a flow diagram that illustrates the logical processing of the transformation of a view file in one embodiment.

FIG. 4 is a flow diagram that illustrates the logical processing of the transformation of a view file in one embodiment. The transform of a view file is performed by XSLT transforms that are serially applied to the view file. In block 401, the component invokes a transform body component. In block 402, the component invokes a transform textbox component. In block 403, the component transforms xsl:when elements to xsl:if elements. In block 404, the component adds identifier and name attributes to controls. In block 405, the component adds href attributes to anchor elements. In block 406, the component adds onchange attributes to controls for validation and rules. In block 407, the component adds an xsl:if element inside control elements for error reporting and then returns.

Figure 5:
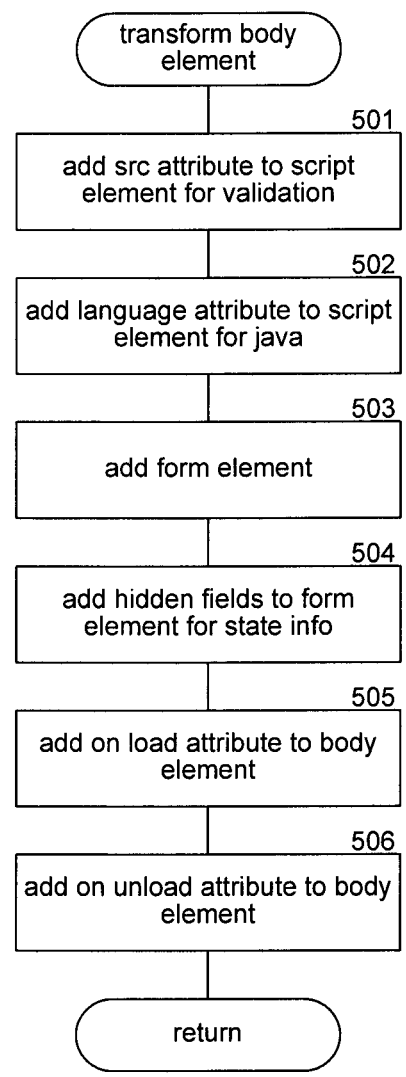
FIG. 5 is a flow diagram that illustrates the logical processing of a transform body element component of the conversion component in one embodiment.

FIG. 5 is a flow diagram that illustrates the logical processing of a transform body element component of the conversion component in one embodiment. In block 501, the component adds to the body element an src attribute to the script element for validation. In block 502, the component adds to the body element a language attribute to the script element. In block 503, the component adds to the body element a form element. In block 504, the component adds hidden fields to the form element for state information storage. In block 505, the component adds to the body element an onload attribute. In block 506, the component adds to the body element an onunload attribute and then returns.

Figure 6:
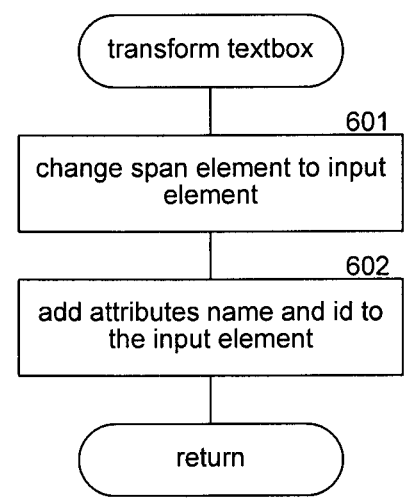
FIG. 6 is a flow diagram that illustrates the logical processing of the transform textbox component of the conversion component in one embodiment.

FIG. 6 is a flow diagram that illustrates the logical processing of the transform textbox component of the conversion component in one embodiment. In block 601, the component changes a span element to an input element. In block 602, the component adds attributes of name and id to the input element and then returns.

Figure 7:
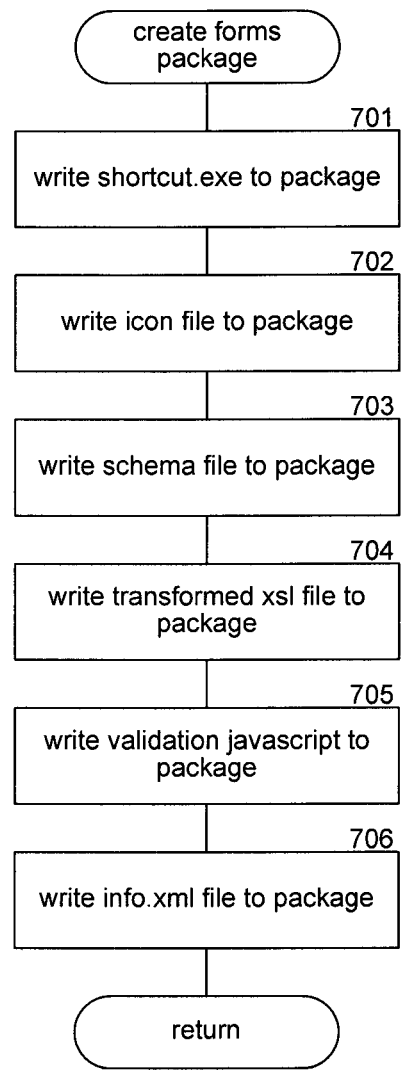
FIG. 7 is a flow diagram that illustrates the logical processing of the create forms package component of the conversion component in one embodiment.

FIG. 7 is a flow diagram that illustrates the logical processing of the create forms package component of the conversion component in one embodiment. In block 701, the component writes a launch executable to the forms package. In block 702, the component writes an icon file to the forms package. In block 703, the component writes the schema file and template file to the forms package. In block 704, the component writes the transformed views file to the package. In block 705, the component writes the validation script to the forms package. In block 706, the component writes the information file to the forms package and then returns the forms package. In one embodiment, the component may also add all the other expanded files of the forms file to the forms package.

Figure 8:
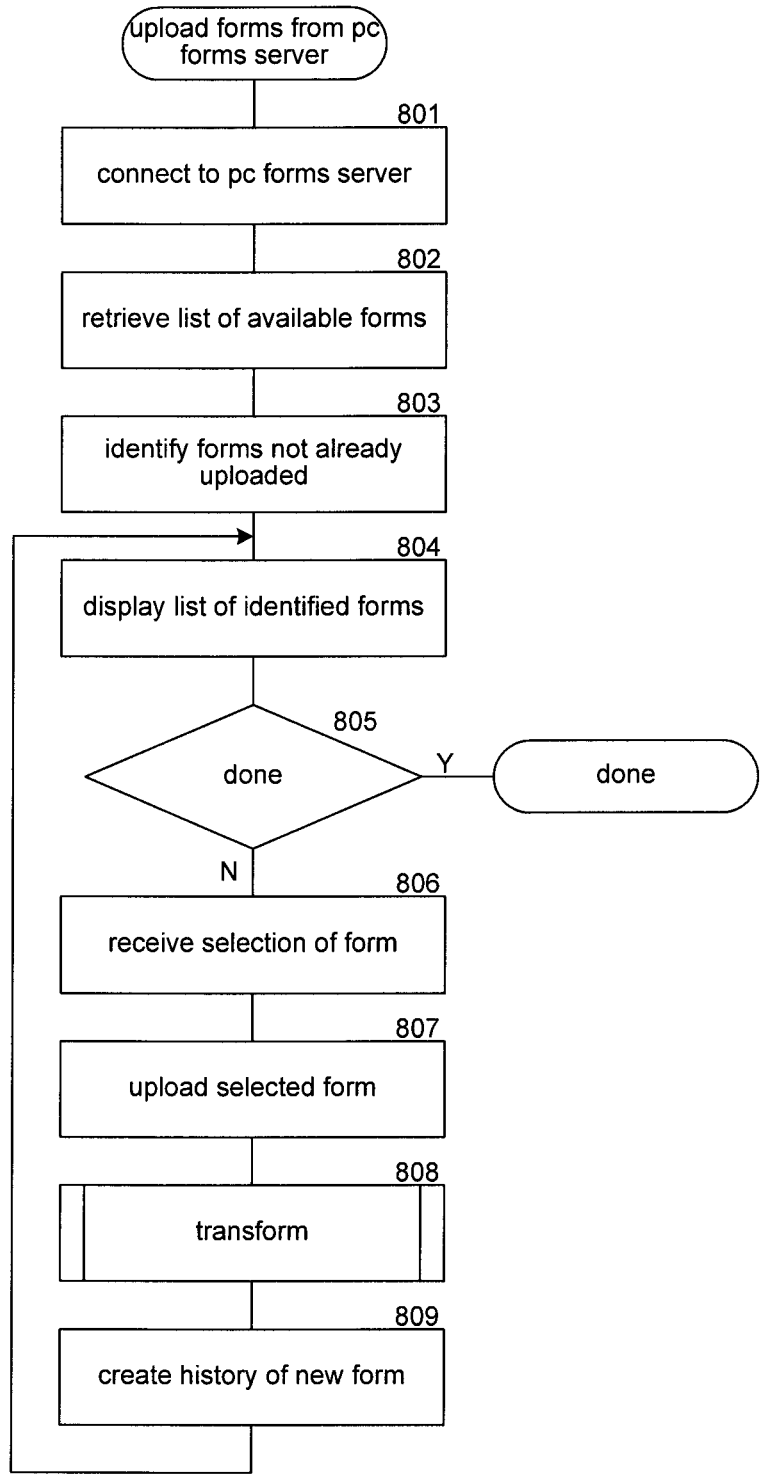
FIG. 8 is a flow diagram that illustrates the processing of the register user component of the deployment system in one embodiment.

FIG. 8 is a flow diagram that illustrates the processing of the upload forms from the desktop forms server component of the forms system in some embodiments. The component is responsible for uploading forms for an account, transforming the forms, and storing the transformed forms. In block 801, the component connects to a desktop forms server to which forms have been published. In block 802, the component retrieves the list of available forms for an account. In block 803, the component identifies the forms that have not already been uploaded to the mobile forms server. In blocks 804-809, the component loops uploading forms. In block 804, the component displays a list of the identified forms. In decision block 805, if the user indicates to complete, then the component completes, else the component continues at block 806. In block 806, the component receives a selection of a displayed form from the user. In block 807, the component uploads the selected form from the desktop forms server to the mobile forms server and store it in association with a designated account. In block 808, the component invokes the transform component to transform the uploaded form. In block 809, the component creates a history for the new form to track its revision history. The component then loops to block 804 to receive the selection of the next form.

Figure 9:
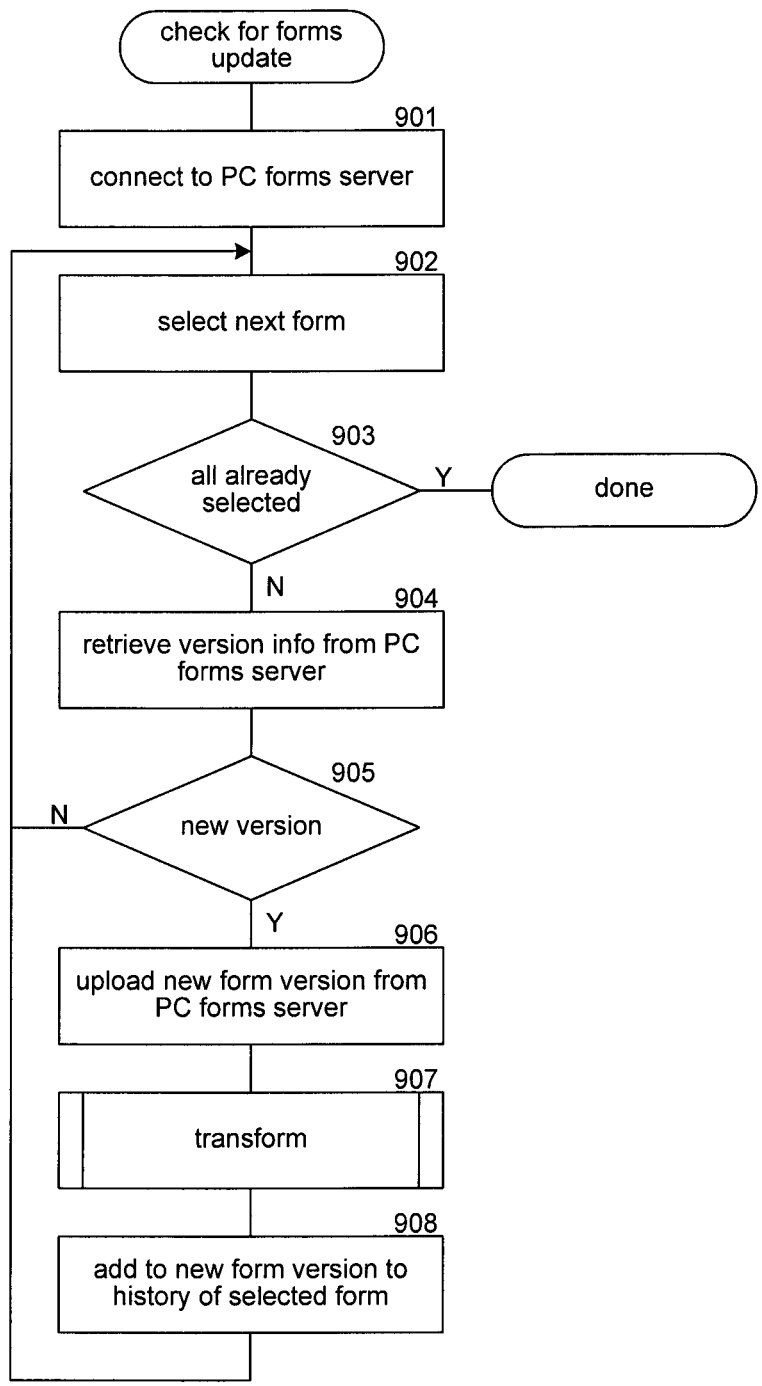
FIG. 9 is a flow diagram that illustrates the processing of the send forms component of the deployment system in one embodiment.

FIG. 9 is a flow diagram that illustrates the processing of the check for forms update component of the forms system in some embodiments. The component is invoked periodically to check whether any of the forms that have been uploaded from the desktop forms server have been revised. If so, the component uploads the revised version. In block 901, the component connects to the desktop forms server. In block 902, the component selects the next form for the account that has been uploaded from the desktop forms server. In decision block 903, if all such forms have already been selected, then the component completes, else the component continues at block 904. In block 904, the component retrieves the version information for the selected form from the desktop forms server. In decision block 904, if a new version of the form is available, then the component continues at block 906, else the component loops to block 902 to select the next form. In block 906, the component uploads the new form from the desktop forms server. In block 907, the component invokes the transform component to transform the uploaded form. In block 908, the component adds the new form version to the history for the selected form. The component then loops to block 902 to select the next form.

Figure 10:
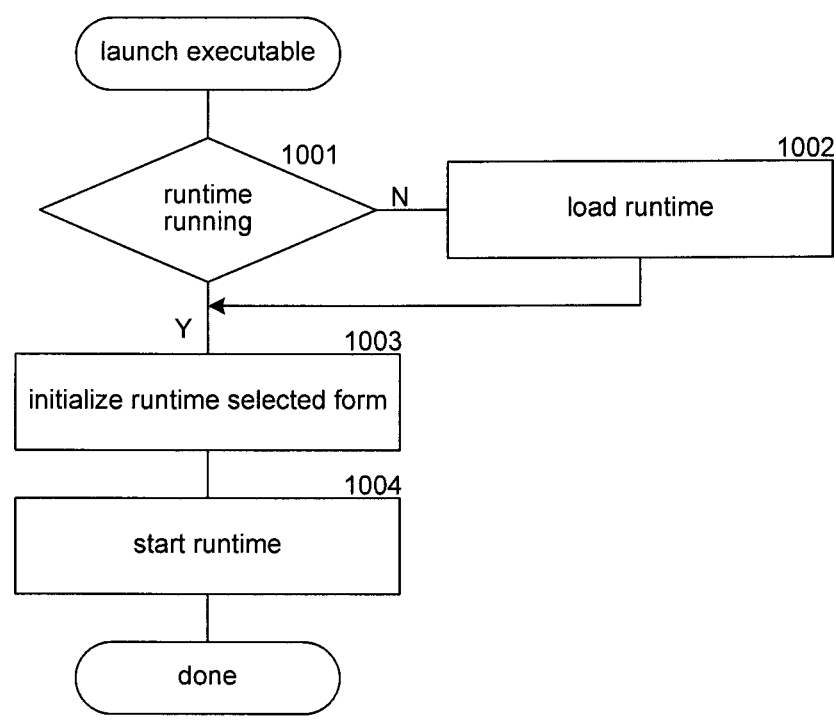
FIG. 10 is a flow diagram that illustrates the processing of a launch executable component of the device component in one embodiment.
Figure 11:
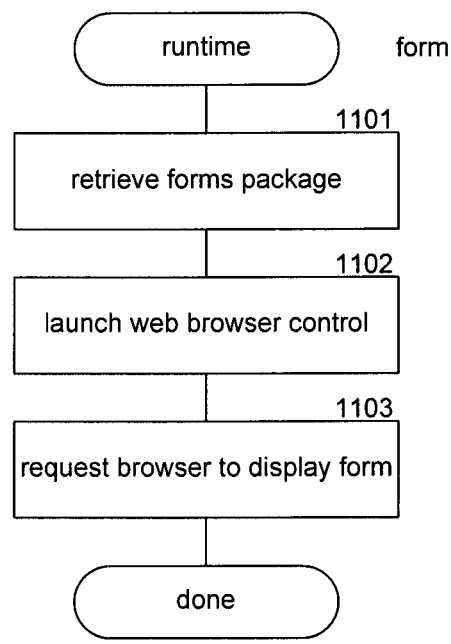
FIG. 11 is a flow diagram that illustrates the processing of aspects of the runtime component of the device component in one embodiment.
Figure 12:
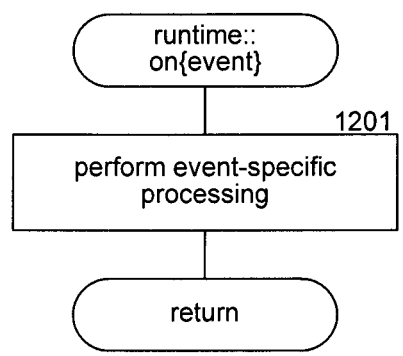
FIG. 12 is a flow diagram that illustrates the processing of the runtime component when an event is received from the web browser component.

FIG. 10-12 are flow diagrams that illustrate the processing of components of the device component in one embodiment. FIG. 10 is a flow diagram that illustrates the processing of a launch executable component of the device component in one embodiment. In decision block 1001, if the runtime component is currently running on the device, then the component continues at block 1003, else the component continues at block 1002. In block 1002, the component loads the runtime component. In block 1003, the component initializes the runtime component to display the form of the selected forms package. In block 1004, the component starts execution of the runtime component and then completes.

FIG. 11 is a flow diagram that illustrates the processing of aspects of the runtime component of the device component in one embodiment. The runtime component is provided a forms package. In block 1101, the component selects the forms package. In block 1102, the component launches a web browser component. In block 1103, the component requests the web browser component to display the form of the forms package and then completes.

FIG. 12 is a flow diagram that illustrates the processing of the runtime component when an event is received from the web browser component. In block 1201, when an event is received by the web browser component, the runtime component performs the specific processing appropriate for that event. For example, if the event is an indication that the submit button has been selected, then the runtime component controls the submitting of the data of the form to the web service identified by the submit control. The component then returns to continue processing the form. The runtime component may also authenticate the user with the web service.

Figure 13:
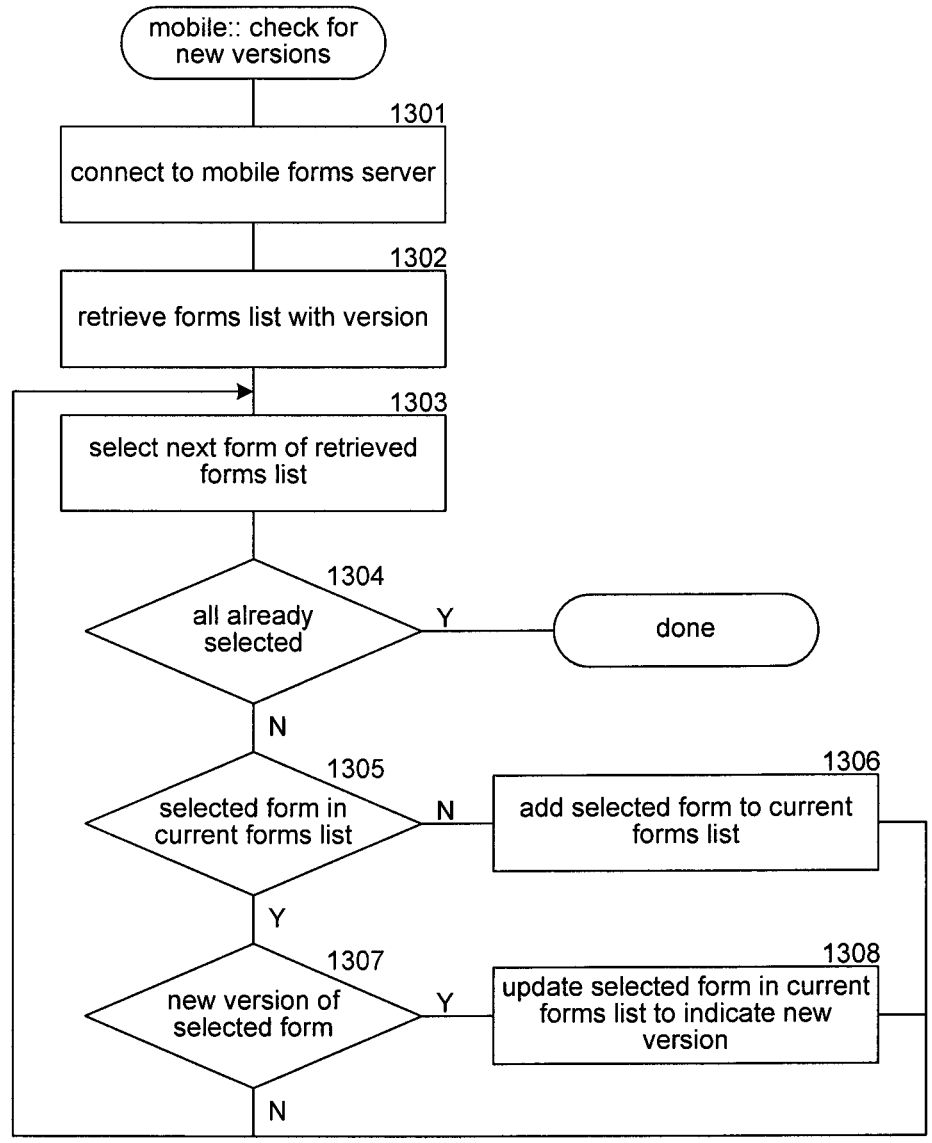
FIG. 13 is a flow diagram that illustrates the processing of the check for new versions component of the device component in some embodiments.

FIG. 13 is a flow diagram that illustrates the processing of the check for new versions component of the device component in some embodiments. The component is invoked periodically by a mobile device to check for new forms or new versions of forms for an account for which the user and device combination are assigned. In block 1301, the component connects to the mobile forms server. In block 1302, the component retrieves a forms list for the account from the mobile forms server. In blocks 1303-1308, the component loops detecting new forms and new versions of existing forms. In block 1303, the component selects the next form of the retrieved forms list. In decision block 1304, if all such forms have already been selected, then the component completes, else the component continues at block 1305. In decision block 1305, if the selected form is in the current forms list for the mobile device, then the component continues at block 1307, else the component continues at block 1306. In block 1306, the component adds an indication of the selected form to the current forms list of the device and then loops to block 1303 to select the next form. In decision block 1307, if a new version of the selected form is available, then the component continues at block 1308, else the component loops to block 1303 to select the next form. In block 1308, the component updates the selected form in the current forms list to indicate the new version. The component then loops to block 1303 to select the next form.

Figure 14:
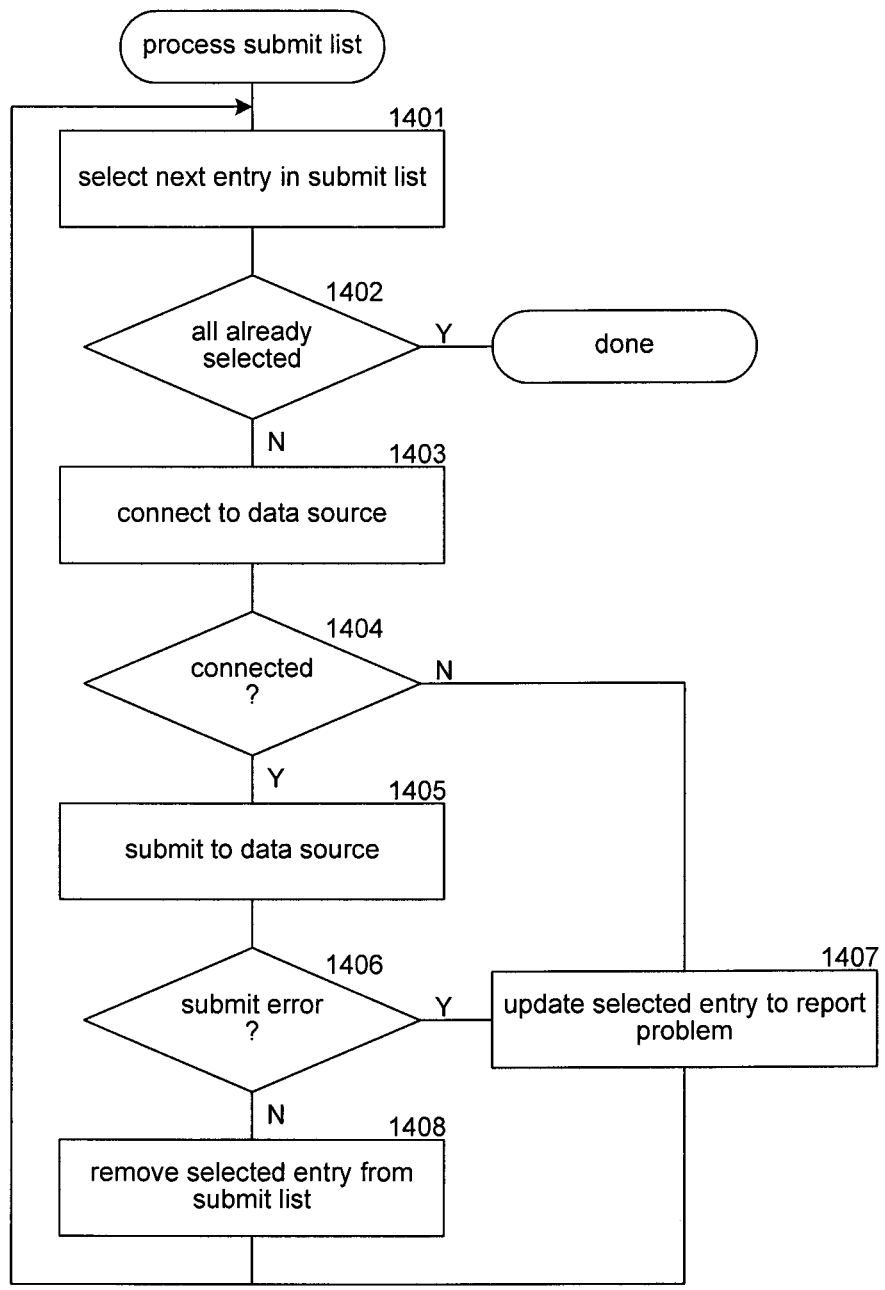
FIG. 14 is a flow diagram that illustrates the processing of the process submit list component of the device component in some embodiments.

FIG. 14 is a flow diagram that illustrates the processing of the process submit list component of the device component in some embodiments. The component is invoked periodically to process each entry of the submit list to determine whether the data of the entry can be submitted to its data source. In block 1401, the component selects the next entry of the submit list. In decision block 1402, if all the entries of the submit list have already been selected, then the component completes, else the component continues at block 1403. In block 1403, the component attempts to connect to the data source designated by the selected entry. In decision block 1404, if the connection was successful, then the component continues at block 1505, else the component continues at block 1407. In block 1405, the component attempts to submit the data of the selected entry to the data source. In decision block 1406, if the submission was unsuccessful, then the component continues at block 1407, else the component continues at block 1408. In block 1407, the component updates the selected entry to report a problem in either connecting to the data source or submitting the data to the data source and then loops to block 1401 to select the next entry. In block 1408, the component removes the selected entry from the submit list and then loops to block 1401 to select the next entry.

Figures 2, 15:
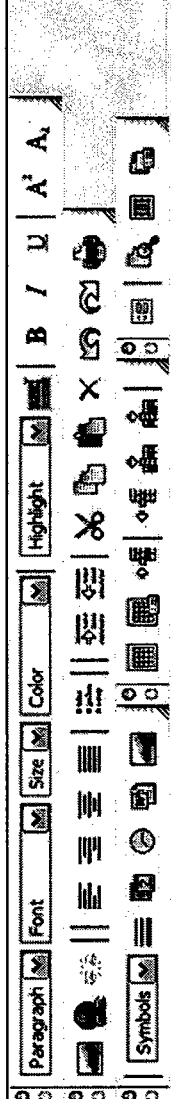
Figures 6, 7, 15:
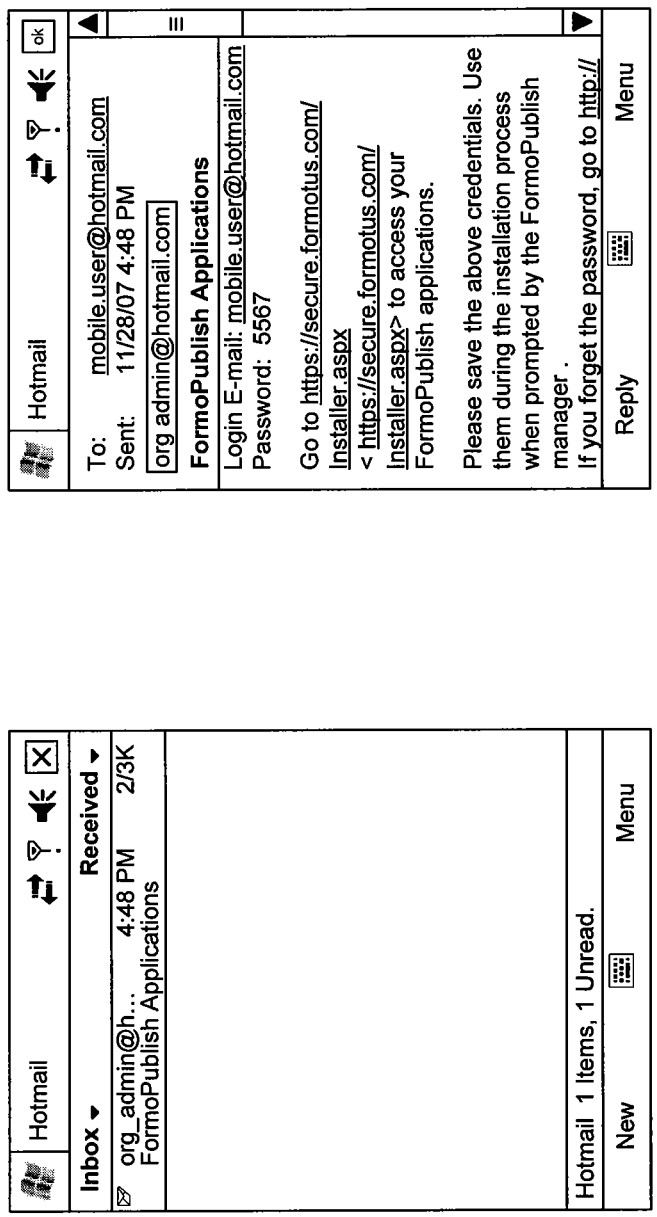
Figures 11, 15:
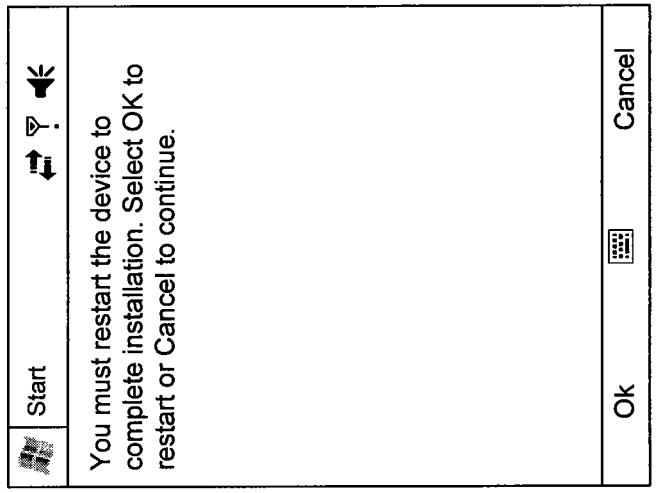
Figures 10, 15:
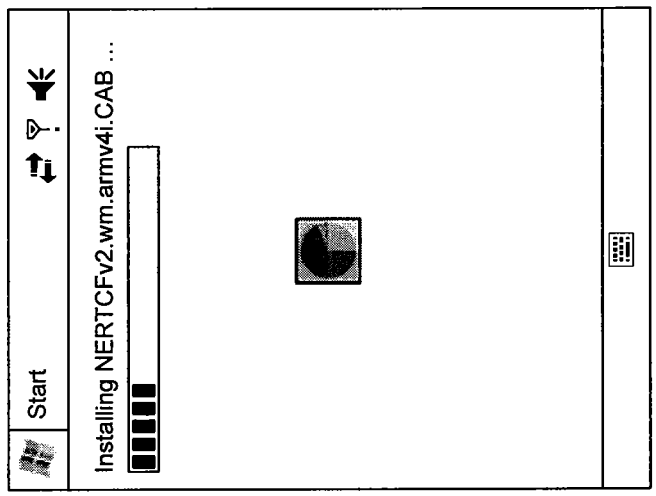
Figures 13, 15:
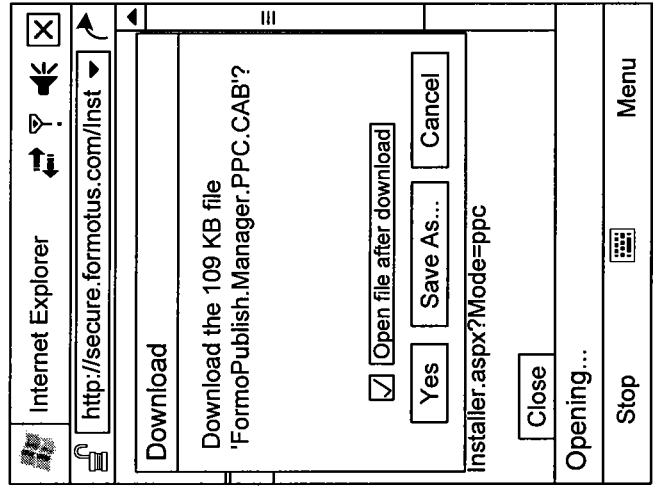
Figures 12, 15:
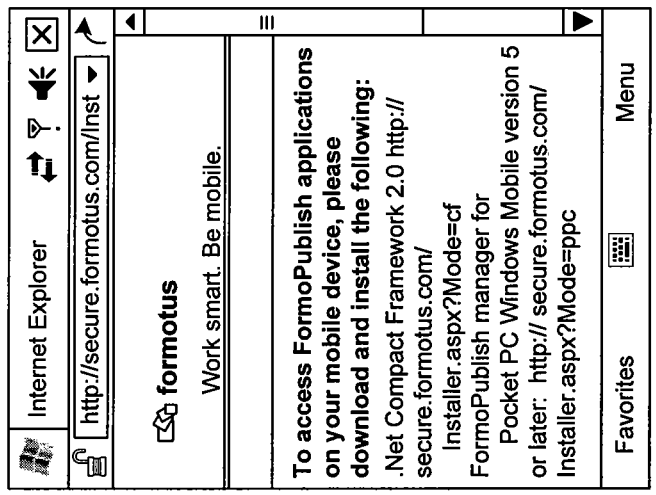
Figure 15:
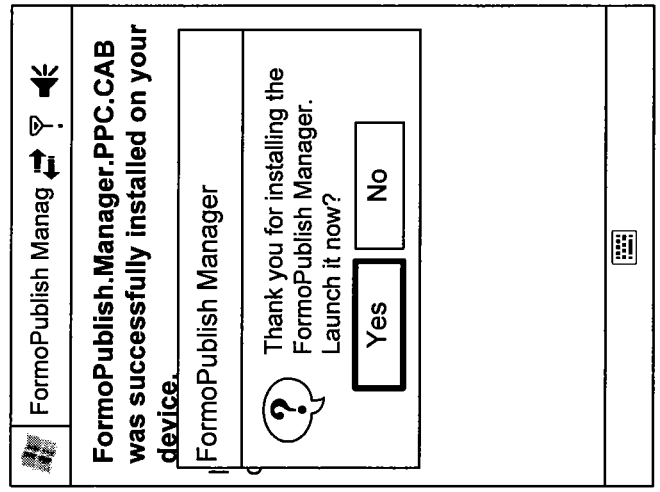
Figures 14, 15:
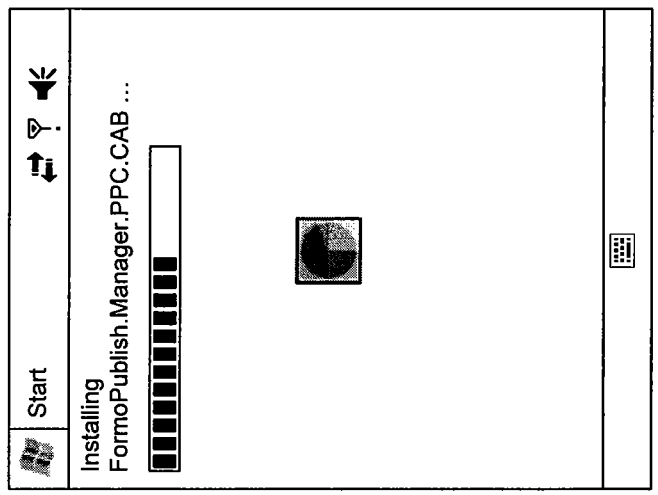

FIGS. 15-1 through 15-23 illustrate various user interfaces of the form systems in some embodiments. FIG. 15-1 illustrates the user interface for viewing uploaded forms. Display page 15010 includes a forms find area 15011 and a results area 15012. The forms find area includes a find field for locating forms that have already been uploaded to the mobile forms server. The results area lists the formats. The add button allows additional forms to be uploaded. The do actions button allows a user to select the appropriate action to be performed on the selected forms. FIG. 15-2 illustrates the user interface for uploading a form. Display page 15020 allows a user to input the name of the form to be uploaded (e.g., from a local disk or a desktop forms server), an icon to be associated with the form, and a description of the form. When the user selects the upload button, the form is uploaded to the mobile forms server. FIG. 15-3 illustrates the user interface for viewing information relating to a form. Display page 15030 includes an upload information area 15031, a preview area 15032, and a publish area 15033. When a user selects the preview button, a preview of what the form will look like on a mobile device is displayed. The publish button allows the form to be published to that it is accessible by mobile devices.

FIG. 15-4 illustrates the user interface for managing information relating to mobile users. Display page 15040 includes a find user area 15041 and a results area 15042. Each user has an associated electronic mail address, so that the forms system can send electronic mail messages to the user. The add button allows a new user to be added, and the do action button allows various actions to be performed for the selected users. FIG. 15-5 illustrates the user interface for managing registered mobile devices. Display page 15050 includes a find area 15051 and a results area 15052. An administrator can use the find area to specify mobile devices of interest. The results area lists the mobile devices that have been found. An administrator may also select the do action button to perform various actions for the selected mobile devices. The mobile devices may be registered automatically when a user registers.

Figures 15, 16, 17:
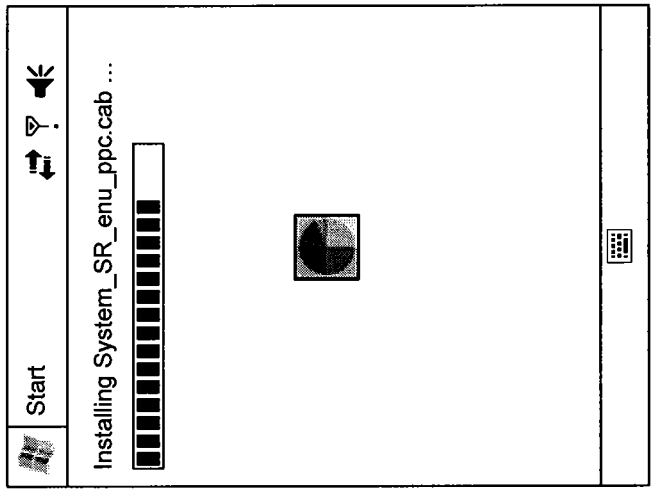
Figures 15, 16:
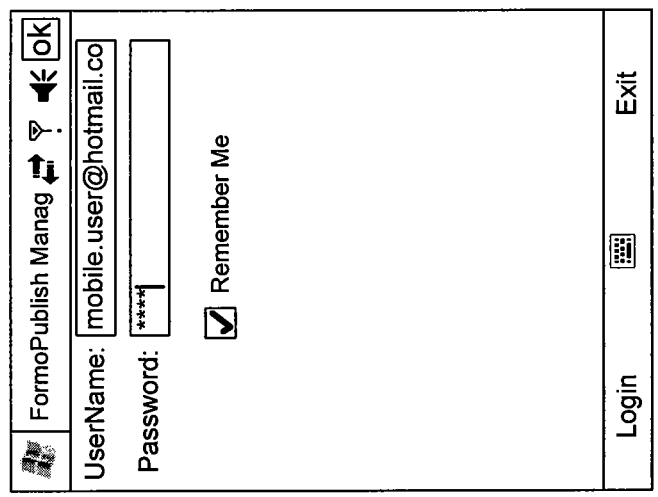
Figures 15, 16, 17, 18, 19:
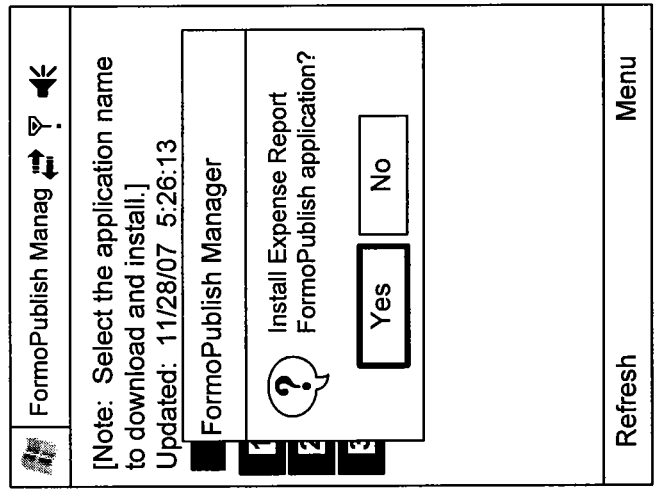
Figures 15, 16, 17, 18:
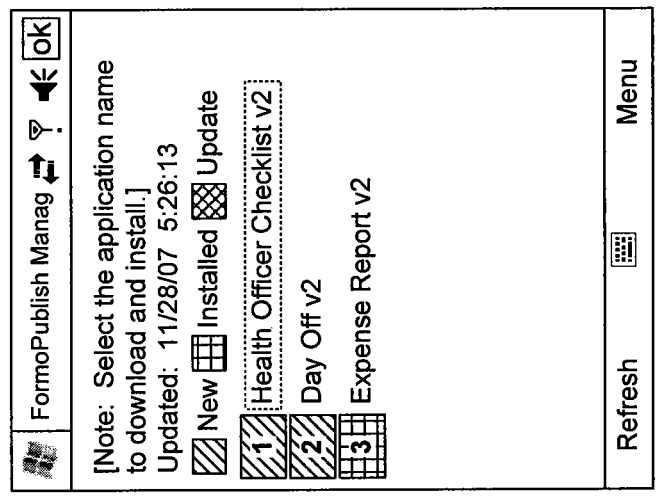
Figures 15, 16, 17, 18, 19, 20, 21:
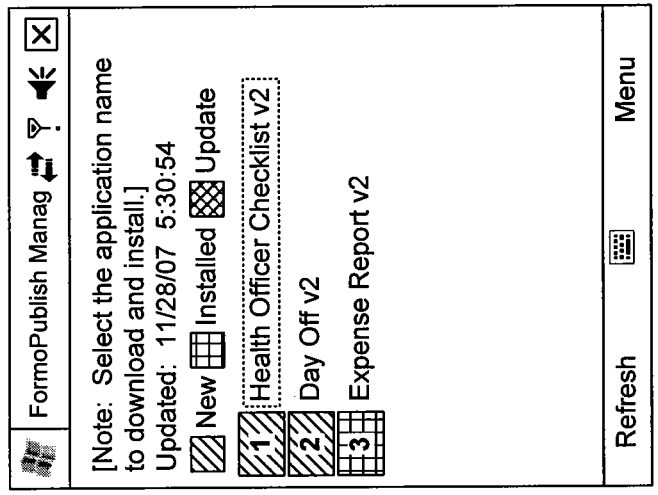
Figures 15, 16, 17, 18, 19, 20:
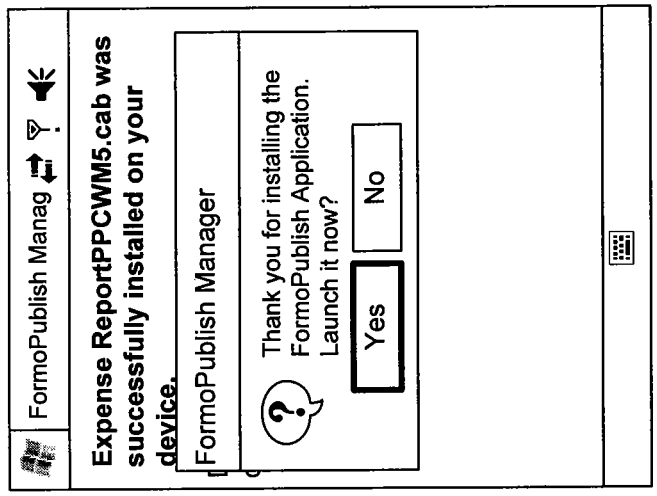

FIG. 15-6 illustrates an electronic mail message for inviting a user to register with the mobile forms server. FIG. 15-7 illustrates the content of the electronic mail message. The electronic mail message provides login information along with a link to the mobile forms server for installing the device component and forms on the mobile device. FIG. 15-8 illustrates a display page instructing a user how to download the device component to the mobile device. FIG. 15-9 illustrates a dialog asking the user to confirm that the user wants to download the device component. FIG. 15-10 illustrates a display page showing the status of the download. FIG. 15-11 illustrates a display page with instructions to continue the installation. FIG. 15-12 illustrates a display page for continuing the download. FIG. 15-13 illustrates a dialog confirming that the user wants to continue with the download. FIG. 15-14 illustrates a display page showing the status of the download. FIG. 15-15 illustrates a dialog asking whether to launch the download device component. FIG. 15-16 illustrates a display page for inputting a user's credentials. FIG. 15-17 illustrates the progress of installing the device component that has been downloaded. FIG. 15-18 illustrates display page showing the status of the available forms. In this example, three forms have been published but not yet downloaded to the mobile device. The status of a form may be indicated by highlighting (e.g., with different icon, shading, or colors). For example, the color red may indicate that a published form has not yet been downloaded, the color green may indicate that the published form has already been installed at the mobile device, and the color orange may indicate that, although form has been installed on the mobile device, an updated version is available from the mobile forms server. FIG. 15-19 illustrates a dialog box requesting confirmation installation of a downloaded a form. FIG. 15-20 illustrates a dialog for confirming download and requesting to launch the downloaded form. FIG. 15-21 illustrates the status of the published of forms. In this example, the expense report form is associated with the color green to indicate that it has been already downloaded.

FIG. 15-22 illustrates a sample form. In this example, an expense report is shown. The device component may provide a submit button and a menu button for every form. FIG. 15-23 illustrates a warning window indicating that a date field cannot be properly validated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer system for converting a source form definition file designed for execution by a source forms display program on a variety of devices to a target form definition file designed for execution by a target forms display program on a device of a target device type, the source forms display program and the target forms display program being different programs such that the target forms display program does not support one or more elements that are supported by the source display program, the source form definition file being compatible with the source forms display program, the computer system comprising:

a memory storing computer-executable instructions of:
a component that provides the source form definition file that is designed for execution by the source forms display program on a variety of devices, the source form definition file including a manifest file, a schema file, and a view file, the view file for being applied to data formatted in accordance with the schema file to generate a view of the data and being tailored to characteristics of the device of the target device type, the view file being compatible with the source forms display program, but not being compatible with the target forms display program because of an element not supported by the target forms display program;
a component that transforms the view file of the source form definition file to create a transformed view file that is compatible with the target forms display program such that an element of the view file that is not supported by the target forms display program is transformed into an element that is supported by the target forms display program and such that a placeholder control of the view file is replaced with a custom control to provide functionality supported by the target forms display program, but not supported by the source forms display program;
a component that generates an information file that records information extracted from the manifest file; and
a component that creates a forms package with the transformed view file, the schema file, and the information file as the target form definition file for distribution to a device of the target device type that executes the target forms display program; and
a processor that executes the computer-executable instructions stored in the memory.

2. The computer system of claim 1 wherein the information file includes mappings of controls to data, web services information, rules information, and custom validation information.

3. The computer system of claim 1 wherein the transforming transforms body elements and textbox elements.

4. The computer system of claim 1 wherein the transforming adds elements within control elements for highlighting the control elements upon occurrence of an error.

5. The computer system of claim 1 wherein the transforming adds an identifier and name attribute to controls to identify the data of the control.

6. The computer system of claim 1 wherein the transforming adds onchange attributes to controls for handling custom validation and rules.

7. The computer system of claim 1 wherein the provided source form definition file is compatible with InfoPath.

8. The computer system of claim 1 wherein the target forms display program includes a web browser of a device of the target device type.

9. The computer system of claim 1 wherein the target device type is selected from the group consisting of a personal digital assistant and a cell phone.

10. A Non-transitory computer-readable storage medium containing computer-executable instructions for controlling a computer system to generate a target form definition file designed for execution by a target forms display program on a device of the target device type, by a method comprising:

providing a generic form definition file for execution by the target forms display program on a variety of devices, the generic form definition file including a view file and other forms data, the view file for being applied to data to generate a view of the data and tailored to characteristics of the device of the target device type; and for each of a plurality of different target forms display programs, applying a transform to the view file to create a transformed view file that is compatible with that target forms display program by converting elements of the view file that are not supported by that target forms display program to elements supported by that target forms display program and by replacing a placeholder control of the view file with a custom control to provide functionality supported by the target forms display program, but not supported by the view file;

generating an information file that records information extracted from the other forms data; and packaging the transformed view file with the information file into a forms package for distribution to a device of the target device type that executes that target forms display program.

11. The computer-readable storage medium of claim 10 wherein the information file includes menu items, mappings of controls to data, web services information, rules information, and custom validation information.

12. The computer-readable storage medium of claim 10 wherein the transform applied to the view file transforms body elements and textbox elements.

13. The computer-readable storage medium of claim 10 wherein the transform applied to the view file converts elements of the view file that are not supported by the target forms display program to elements supported by the target forms display program.

14. The computer-readable storage medium of claim 10 wherein the transform applied to the view file adds elements within control elements for highlighting the control upon occurrence of an error.

15. The computer-readable storage medium of claim 10 wherein the transform applied to the view file adds an identifier and name attribute to controls to identify the data of the controls.

16. The computer-readable storage medium of claim 10 wherein the transform applied to the view file ensures that whenever data of the form is modified, the modified data is persistently stored in the device.

17. The computer-readable storage medium of claim 10 wherein the packaging includes packaging a launch executable for distribution, the launch executable for launching a runtime component to process a form defined by the forms package.

18. A method in a computing system for converting a form definition file designed for execution by a forms display program on a variety of devices to a target form definition file designed for execution by a target forms display program on a device of the target device type, comprising:

providing the form definition file for execution by the forms display program on a variety of devices, the form definition file including a manifest file, a schema file, and a view file, the view file for being applied to data to generate a view of the data and tailored to characteristics of the device of the target device type;

applying a transform to the view file to create a transformed view file that is compatible with the target forms display program wherein the transform transforms elements of the view file that are not supported by the target forms display program to elements supported by the target forms display program and wherein the transform replaces a placeholder control of the view file with a custom control to provide functionality supported by the target forms display program, but not supported by the forms display program;

generating an information file that records information extracted from the manifest file and the schema file, the information file including mappings of controls to data, web services information, rules information, and custom validation information; and packaging the transformed view file, the schema file, and the information file for distribution to a device of the target device type that executes the target forms display program.

19. The method of claim 18 wherein the transform applied to the view file transforms body elements and textbox elements, adds elements within control elements for highlighting the controls upon occurrence of an error, and adds an identifier and name attribute to controls to identify the data of the controls.

* * * * *

UNITED STATES PATENT AND TRADEMARK OFFICE
CERTIFICATE OF CORRECTION

| | |
|---|---|
| PATENT NO. | : 8,464,211 B2 |
| APPLICATION NO. | : 12/040505 |
| DATED | : June 11, 2013 |
| INVENTOR(S) | : Adriana Neagu et al. |

It is certified that error appears in the above-identified patent and that said Letters Patent is hereby corrected as shown below:

In the Specification:

In column 2, line 65, delete "Infopath." and insert -- InfoPath. --, therefor.

In column 9, line 66, delete "on Value" and insert -- onValue --, therefor.

In column 18, line 14-15, delete "component component" and insert -- component --, therefor.

In column 18, line 17-18, delete "component component" and insert -- component --, therefor.

Signed and Sealed this
Nineteenth Day of November, 2013

Teresa Stanek Rea
*Deputy Director of the United States Patent and Trademark Office*